United States Patent
Kawakatsu et al.

(10) Patent No.: US 7,297,568 B2
(45) Date of Patent: Nov. 20, 2007

(54) THREE-DIMENSIONAL STRUCTURAL BODY COMPOSED OF SILICON FINE WIRE, ITS MANUFACTURING METHOD, AND DEVICE USING SAME

(75) Inventors: Hideki Kawakatsu, Tokyo (JP); Dai Kobayashi, Tokyo (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 10/515,334

(22) PCT Filed: Jun. 2, 2003

(86) PCT No.: PCT/JP03/06929

§ 371 (c)(1),
(2), (4) Date: Dec. 2, 2004

(87) PCT Pub. No.: WO03/102549

PCT Pub. Date: Dec. 11, 2003

(65) Prior Publication Data

US 2005/0247998 A1    Nov. 10, 2005

(30) Foreign Application Priority Data

Jun. 3, 2002  (JP) .............................. 2002-161140
May 28, 2003  (JP) .............................. 2003-151255

(51) Int. Cl.
*H01L 21/311*    (2006.01)
(52) U.S. Cl. .................... 438/52; 438/753; 438/701; 438/947; 257/E21.223; 216/2; 216/11
(58) Field of Classification Search .................. 438/52, 438/753, 701, 947, FOR. 458; 257/E21.223; 216/2, 11
See application file for complete search history.

(56) References Cited

U.S. PATENT DOCUMENTS

| | | | |
|---|---|---|---|
| 5,171,992 A | 12/1992 | Clabes et al. | |
| 5,399,415 A | 3/1995 | Chen et al. | |
| 5,543,351 A * | 8/1996 | Hirai et al. | 438/410 |
| 5,856,967 A | 1/1999 | Mamin et al. | |
| 6,013,573 A * | 1/2000 | Yagi | 438/619 |
| 6,611,178 B1 * | 8/2003 | Kawakatsu et al. | 331/154 |

(Continued)

FOREIGN PATENT DOCUMENTS

JP    05-083487    4/1993

(Continued)

OTHER PUBLICATIONS

Eri, Masayoshi. "Shin Sensing Gijutsu o Mezashite Dai 8 Kai Microsensor", Keisoku to Seigyo, vol. 36, No. 11, pp. 808-817 1997.

(Continued)

*Primary Examiner*—George Fourson
(74) *Attorney, Agent, or Firm*—Oblon, Spivak, McClelland, Maier & Neustadt, P.C.

(57) ABSTRACT

A three-dimensional structure composed of highly-reliable silicon ultrafine wires, a method for producing the three-dimensional structure, and a device including the same are provided. The three-dimensional structure composed of silicon fine wires includes wires (2) on the order of nanometers to micrometers formed by wet etching utilizing the crystallinity of a single-crystal material.

12 Claims, 28 Drawing Sheets

U.S. PATENT DOCUMENTS

| | | |
|---|---|---|
| 2001/0019029 A1 | 9/2001 | Tai et al. |
| 2002/0048962 A1* | 4/2002 | Sekimura .................. 438/746 |
| 2002/0108926 A1* | 8/2002 | Witvrouw et al. ............. 216/2 |
| 2005/0247998 A1 | 11/2005 | Kawakatsu et al. |

FOREIGN PATENT DOCUMENTS

| | | |
|---|---|---|
| JP | 05-234984 | 9/1993 |
| JP | 06-018257 | 1/1994 |
| JP | 06302513 A * | 10/1994 |
| JP | 07022605 A * | 1/1995 |
| JP | 08-094647 | 4/1996 |
| JP | 8-506857 | 7/1996 |
| JP | 11-515092 | 12/1999 |
| JP | 2001-004455 | 1/2001 |
| JP | 2001-091441 | 4/2001 |

OTHER PUBLICATIONS

Normand, P. et al. "Fabrication of Si nano-wires using anisotropic dry and wet etching", Microelectronic Engineering, vol. 41/42, pp. 551-554 1998.

Hu, Hsin-Hwa et al. "The diagnostic micromachined beams on (1 1 1) substrate", Sensors and Actuators A, vol. 93, pp. 258-265 2001.

U.S. Appl. No. 10/567,904, filed Feb. 10, 2006, Kobayashi et al.

U.S. Appl. No. 10/564,447, filed Jan. 12, 2006, Kobayashi et al.

* cited by examiner

F I G. 1
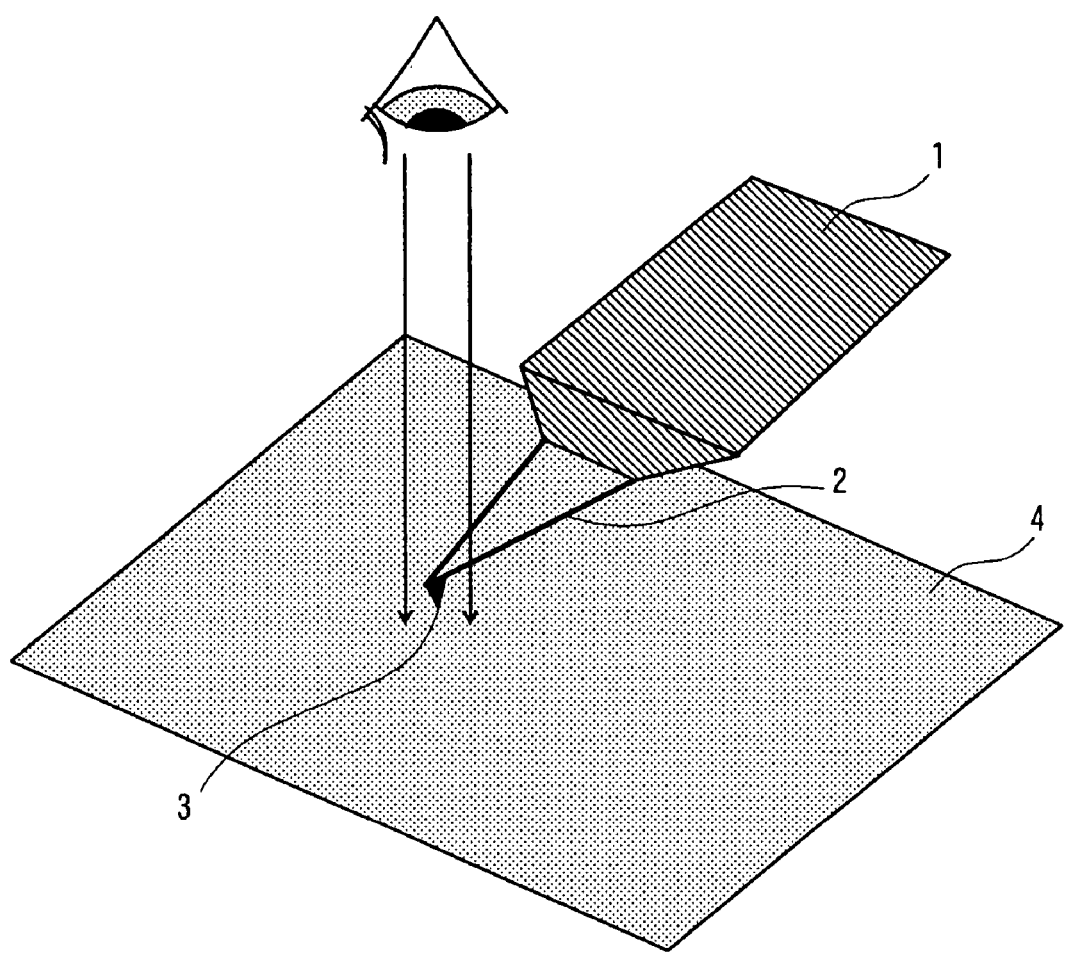

(a-1)

(a-2)

(b-1)

(b-2)

(c-1)

(c-2)

(d-1)

(d-2)
(d-3)

(d-4)

(d-5)

(d-6)

(g-1)

(g-2)

(g-3)

(h-1)

(h-2)

(a)

(b)

(c)

(a)

(b)

(c)

(a)

(b)

(c)

(e-1)

(e-2)

(f-1)

(f-2)

(g-1)

(g-2)

(h-1)

(h-2)

(i-1)

(i-2)

(j-1)

(j-2)

(a)

(b)

(c)

(a)

(b)

(c)

(a-1)

(a-2)

(b-1)

(b-2)

(c-1)

(c-2)

(a)

(b)

(c)

(a)

(b)

(c)

(a-1)

(a-2)

(b-1)

(b-2)

(c-1)

(c-2)

(d-1)

(d-2)

(e-1)

(e-2)

(f-1)

(f-2)

(g-1)

(g-2)

(h-1)

(h-2)

(i-1)

(i-2)

THREE-DIMENSIONAL STRUCTURAL BODY COMPOSED OF SILICON FINE WIRE, ITS MANUFACTURING METHOD, AND DEVICE USING SAME

TECHNICAL FIELD

The present invention relates to a three-dimensional structure composed of silicon fine wires. In particular, the present invention relates to a three-dimensional structure using wires on the order of nanometers (referred to as nano) to micrometers formed by etching utilizing the crystallinity of silicon etc. as elements, a method for producing the same, and a device including the same.

BACKGROUND ART

Conventionally, a plate or block structure composed of silicon or a structure formed by bending a metal conducting wire provides elements such as oscillators and coils.

In general, a tip magnetized with cobalt or iron etc. is used as a tip of an atomic force microscope to detect a magnetic field.

Furthermore, the present inventors have already proposed elements such as a cantilever composed of a fine three-dimensional structure in the following Patent Document 1 etc.

[Patent Document 1]
Japanese Unexamined Patent Application Publication No. 2001-91441 (pp. 7-8, FIG. 4)

[Patent Document 2]
Japanese Unexamined Patent Application Publication No. 2001-289768 (pp. 3-4, FIG. 1)

[Patent Document 3]
Japanese Unexamined Patent Application Publication No. 2003-114182 (pp. 5-6, FIG. 1)

DISCLOSURE OF INVENTION

However, with the known fine tip described above, in-process control of the magnetic force is impossible.

In a scanning temperature microscope, a loop used as the temperature sensing element is produced by hand or by nanofabrication piece by piece. Therefore, confirmation tests and multipoint measurements are difficult to achieve.

Furthermore, a plate-shaped cantilever used in a known scanning force microscope within a scanning electron microscope causes the following problems: When scanning electron microscopy observation is performed perpendicularly to the sample, the cantilever blocks the observation point, so that it is difficult to observe the sample, and to identify the observation point.

It is expected that miniaturization of the cantilever using a three-dimensional structure composed of silicon fine wires will improve the sensitivity in mass spectrometry and force detection. However, in this technology, damage such as crystal defects in the vicinity of the surface significantly affects the Q factor as a mechanical oscillator. Such damage in the vicinity of the surface must be reduced. In particular, when the three-dimensional structure composed of silicon fine wires is formed by reactive ion etching (anisotropic etching), the damage such as crystal defects is increased. Therefore, it is important to study etching techniques.

In view of the above situation, it is an object of the present invention to provide a highly-reliable three-dimensional structure composed of silicon ultrafine wires, a method for producing the same, and a device including the same.

In order to achieve the above object, the present invention provides the following:

[1] A three-dimensional structure composed of silicon fine wires including wires on the order of nanometers to micrometers formed by wet etching utilizing the crystallinity of a single-crystal material.

[2] The three-dimensional structure composed of silicon fine wires according to [1] above, being a fine coil composed of a plurality of the wires.

[3] A device including a three-dimensional structure composed of silicon fine wires, wherein a magnetic field is generated or detected with a fine coil composed of a plurality of wires on the order of nanometers to micrometers formed by wet etching utilizing the crystallinity of a single-crystal material.

[4] A device including a three-dimensional structure composed of silicon fine wires, wherein the temperature in a minute area is measured using the temperature-dependent resistance variation of a fine coil composed of a plurality of wires on the order of nanometers to micrometers formed by wet etching utilizing the crystallinity of a single-crystal material.

[5] The device including a three-dimensional structure composed of silicon fine wires according to [4] above, wherein the fine coil is used in visualization of the temperature distribution of planar samples, visualization of the temperature distribution and metabolism of biological materials, and mapping of the temperature distribution of electronic devices.

[6] A device including a three-dimensional structure composed of silicon fine wires, wherein the interaction or the change in force or mass on the atomic level is detected utilizing the change in amplitude, phase, or self-excited frequency of an oscillator composed of a plurality of wires on the order of nanometers to micrometers formed by wet etching utilizing the crystallinity of a single-crystal material.

[7] A device including a three-dimensional structure composed of silicon fine wires, wherein a sample having a specific particle size is trapped in a network structure composed of a plurality of wires on the order of nanometers to micrometers formed by wet etching utilizing the crystallinity of a single-crystal material.

[8] The device including a three-dimensional structure composed of silicon fine wires according to [7] above, being a filter to absorb a specific substance, the filter being formed by modifying the surface of the network structure.

[9] The device including a three-dimensional structure composed of silicon fine wires according to [7] above, wherein the network structure is an elastic body as a whole so that the structure is elastic.

[10] The device including a three-dimensional structure composed of silicon fine wires according to [7] above, wherein the network structure is a three-dimensional optical filter, a grating, or a shielding window.

[11] The device including a three-dimensional structure composed of silicon fine wires according to [7] above, wherein the network structure is a resistor having a grid structure, thereby providing an electrical circuit network.

[12] A device including a three-dimensional structure composed of silicon fine wires, wherein the three-dimensional structure composed of a plurality of wires on the order of nanometers to micrometers formed by wet etching utilizing the crystallinity of a single-crystal material, and a tip or a block formed at an intersection of the wires by the wet etching is used as a probe or a mass to provide the structure with predetermined vibration characteristics.

[13] A device including a three-dimensional structure composed of silicon fine wires, wherein the device includes a microscope tip with which an observation portion is readily observed, the tip composed of a plurality of wires on the order of nanometers to micrometers formed by wet etching utilizing the crystallinity of a single-crystal material.

[14] A method for producing a three-dimensional structure composed of silicon fine wires, the method including the steps of preparing a silicon-on-insulator (SOI) substrate having a surface composed of the {100} surface of silicon single-crystals thereon; forming a silicon oxide film on a part of an SOI layer of the SOI substrate; forming a silicon nitride film on the silicon oxide film and the a part of the SOI layer; removing a part of the silicon nitride film to expose the SOI layer such that elongated shapes are repeatedly arranged so as to be parallel to the <110> direction; removing the exposed SOI layer portions by wet etching; thermally oxidizing the {111} surface exposed by the wet etching to form a thermally-oxidized film; removing a part of the remaining silicon nitride film and wet etching the newly exposed SOI layer to form an array of silicon fine wires; and removing a buried oxide film of the SOI substrate to form silicon fine wires that can be independently oscillated.

[15] The method for producing a three-dimensional structure composed of silicon fine wires according to [14] above, wherein proximal ends of the silicon fine wires are formed so as to have different shapes on the two lateral sides of each fine wire.

[16] The method for producing a three-dimensional structure composed of silicon fine wires according to [14] above, wherein the silicon fine wires are processed such that each fine wire has the same length.

[17] The method for producing a three-dimensional structure composed of silicon fine wires according to [14] above, wherein the silicon fine wires are processed such that each fine wire has different length.

[18] A method for producing a three-dimensional structure composed of silicon fine wires, the method including the steps of preparing an SOI substrate having a surface composed of the {100} surface of silicon single-crystals thereon; forming a silicon nitride film on an SOI layer of the SOI substrate; removing a part of the silicon nitride film to expose the SOI layer such that elongated shapes are repeatedly arranged so as to be parallel to the <110> direction; removing the exposed SOI layer portions by wet etching; thermally oxidizing the {111} surface exposed by the wet etching to form a thermally-oxidized film; removing a part of the remaining silicon nitride film and wet etching the newly exposed SOI layer to form an array of silicon fine wires; and removing a buried oxide film of the SOI substrate to form silicon fine wires that can be independently oscillated.

[19] The method for producing a three-dimensional structure composed of silicon fine wires according to [18] above, wherein proximal ends of the silicon fine wires are formed so as to have different shapes on the two lateral sides of each fine wire.

[20] The method for producing a three-dimensional structure composed of silicon fine wires according to [18] above, wherein the silicon fine wires are processed such that each fine wire has the same length.

[21] The method for producing a three-dimensional structure composed of silicon fine wires according to [18] above, wherein the silicon fine wires are processed such that each fine wire has different length.

[22] The method for producing a three-dimensional structure composed of silicon fine wires according to [14] above, wherein the three-dimensional structure includes probes.

[23] The method for producing a three-dimensional structure composed of silicon fine wires according to [22] above, wherein the probes are singly-supported beams.

[24] The method for producing a three-dimensional structure composed of silicon fine wires according to [23] above, wherein the singly-supported beams are cantilevers for an atomic force microscope.

[25] The method for producing a three-dimensional structure composed of silicon fine wires according to [22] above, wherein the probes are doubly-supported beams.

[26] The method for producing a three-dimensional structure composed of silicon fine wires according to [18] above, wherein the three-dimensional structure includes probes.

[27] The method for producing a three-dimensional structure composed of silicon fine wires according to [26] above, wherein the probes are singly-supported beams.

[28] The method for producing a three-dimensional structure composed of silicon fine wires according to [27] above, wherein the singly-supported beams are cantilevers for an atomic force microscope.

[29] The method for producing a three-dimensional structure composed of silicon fine wires according to [26] above, wherein the probes are doubly-supported beams.

[30] A three-dimensional structure composed of silicon fine wires produced by the method for producing a three-dimensional structure composed of silicon fine wires according to [14] above.

[31] A three-dimensional structure composed of silicon fine wires produced by the method for producing a three-dimensional structure composed of silicon fine wires according to [18] above.

In other words, the present invention provides the following features:

(1) A coil can be formed using a plurality of silicon fine wires. The coil can be used as a fine coil to generate or detect a magnetic field.

(2) A coil can be formed using a plurality of silicon fine wires. The temperature in a minute area can be measured utilizing the temperature-dependent resistance variation of the coil. The coil can also be used in visualization of the temperature distribution of planar samples, visualization of the temperature distribution and metabolism of biological materials, and mapping of the temperature distribution of electronic devices.

(3) An oscillator can be formed using a plurality of silicon fine wires. The interaction or the change in force or mass on the atomic level can be detected utilizing the change in amplitude, phase, or self-excited frequency of the oscillator.

(4) A network structure can be formed using a plurality of silicon fine wires. The network structure can be used to trap a sample having a specific particle size.

(5) A network structure can be formed using a plurality of silicon fine wires. The network structure achieves a filter to absorb a specific substance by modifying the surface thereof.

(6) A network structure can be formed using a plurality of silicon fine wires to function as an elastic body as a whole. The network structure achieves an elastic body less susceptible to damage.

(7) A network structure can be formed using a plurality of silicon fine wires. The network structure achieves a three-dimensional optical filter, a grating, and a shielding window.

(8) A network structure can be formed using a plurality of silicon fine wires. The network structure forms a resistor having a grid shape to achieve an electrical circuit network.

(9) A structure of up to three-dimensions can be formed using a plurality of silicon fine wires. A tip or a block can be formed at an intersection of the silicon fine wires by wet etching. The tip or the block can be used as a probe or a mass, thereby providing a structure having predetermined vibration characteristics.

(10) Singly-supported beams composed of silicon fine wires are provided, in which the crystallinity of silicon is utilized and no damage such as crystal defects occurs.

(11) Singly-supported beams in which proximal ends of the fine wires functioning as probes have different shapes on the two lateral sides of each fine wire are provided. Such singly-supported beams can be produced inexpensively by a simple process that omits a step of forming a silicon oxide film. The singly-supported beams have a durable structure because the proximal ends of the singly-supported beams have an asymmetrical shape.

(12) Singly-supported beams having excellent probe characteristics and the same length are provided.

(13) Singly-supported beams having excellent probe characteristics and a different length are provided.

(14) Doubly-supported beams composed of silicon fine wires are provided, in which the crystallinity of silicon is utilized and no damage such as crystal defects occurs.

(15) Doubly-supported beams having excellent probe characteristics and the same length are provided.

(16) Doubly-supported beams having excellent probe characteristics and a different length are provided.

(17) A three-dimensional structure having singly-supported beams or doubly-supported beams composed of silicon fine wires and having excellent probe characteristics is provided.

BRIEF DESCRIPTION OF THE DRAWINGS

FIG. 1 is a schematic view of a device having a tip supported by a plurality of fine wires according to an embodiment of the present invention.

BEST MODE FOR CARRYING OUT THE INVENTION

Figure 2:
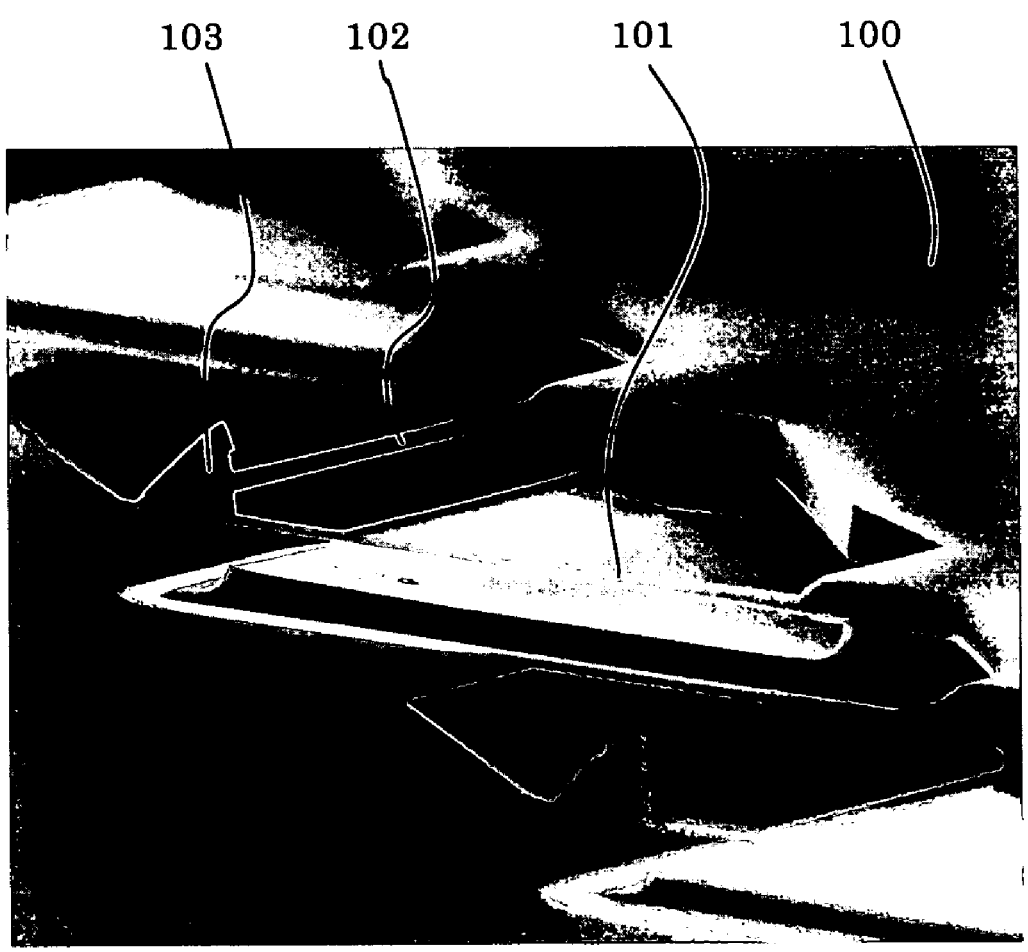
FIG. 2 is a perspective view of an oscillator (device) having a tip supported by a plurality of fine wires according to an embodiment of the present invention.

Embodiments of the present invention will now be described with reference to the drawings.

FIG. 1 is a schematic view of a device having a tip supported by a plurality of fine wires according to an embodiment of the present invention.

In this figure, reference numeral 1 indicates a cantilever base, reference numeral 2 indicates a plurality of fine wires, reference numeral 3 indicates a tip, and reference numeral 4 indicates a sample.

As shown in the figure, since the tip 3 is supported by a plurality of fine wires [on the order of nanometers (hereinafter abbreviated as nano) to micrometers], the observation portion of the sample 4 is not blocked. As a result, the portion being observed with the tip 3 can be readily observed with an optical microscope or a scanning microscope.

The present inventors have already proposed a fine mechanical oscillator formed using a semiconductor material, a method for producing the same, and a measuring device including the same in the above-cited Patent Document 1.

FIG. 2 is a perspective view of an oscillator (device) having a tip supported by a plurality of fine wires according to an embodiment of the present invention.

In this figure, reference numeral 100 indicates an oscillator base, reference numerals 101 and 102 indicate two fine wires, and reference numeral 103 indicates a tip formed at the intersection of the two fine wires 101 and 102.

Figure 3:
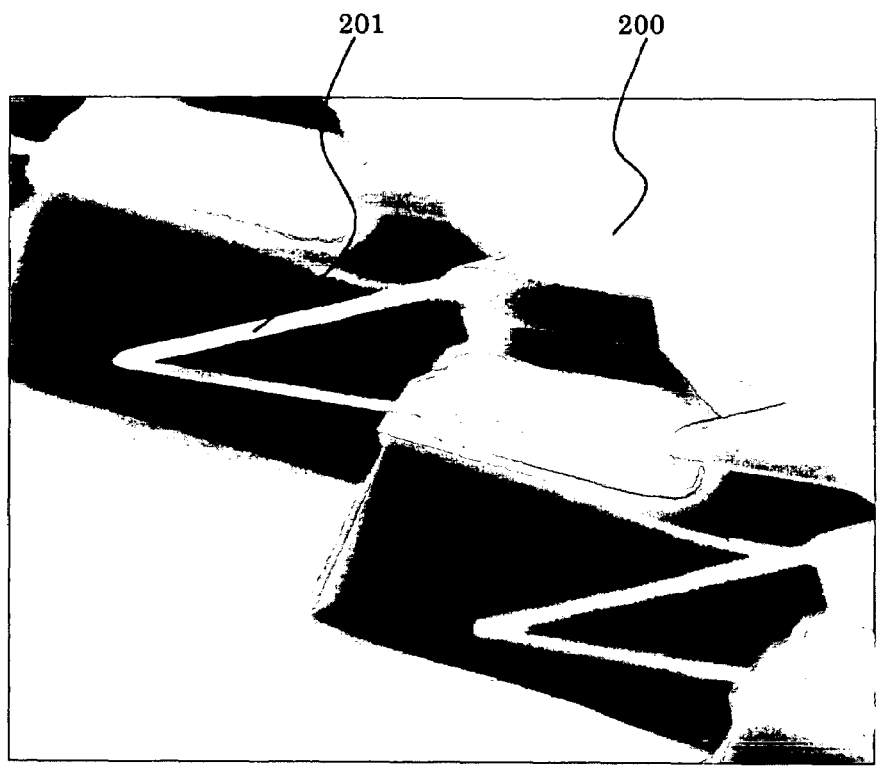
FIG. 3 is a perspective view of a fine coil (device) composed of a plurality of fine wires according to an embodiment of the present invention.

FIG. 3 is a perspective view of a fine coil (device) composed of a plurality of fine wires according to an embodiment of the present invention.

In this figure, reference numeral 200 indicates a fine coil base, and reference numeral 201 indicates a fine coil composed of V-shaped fine wires.

Figure 4:
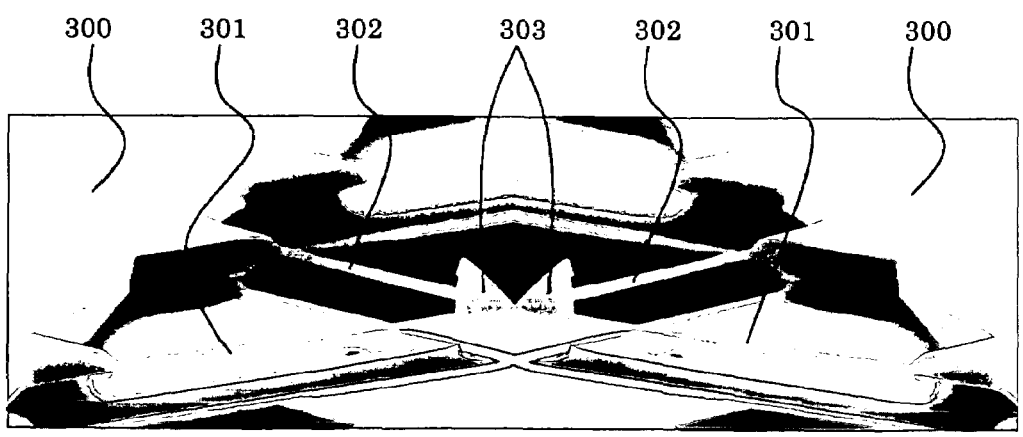
FIG. 4 is a perspective view of an oscillator (device) having tips supported by two doubly-supported fine wires according to an embodiment of the present invention.

FIG. 4 is a perspective view of an oscillator (device) having tips supported by two doubly-supported fine wires according to an embodiment of the present invention.

In this figure, reference numeral 300 indicates oscillator bases disposed at both sides, reference numerals 301 and 302 indicate two fine wires extending from the oscillator bases 300 disposed at both sides thereof, respectively, and reference numeral 303 indicates tips formed at the intersection of the two fine wires 301 and 302.

Alternatively, double coils composed of the two doubly-supported fine wires may be formed without forming the tips 303 shown in FIG. 4.

Figure 5:
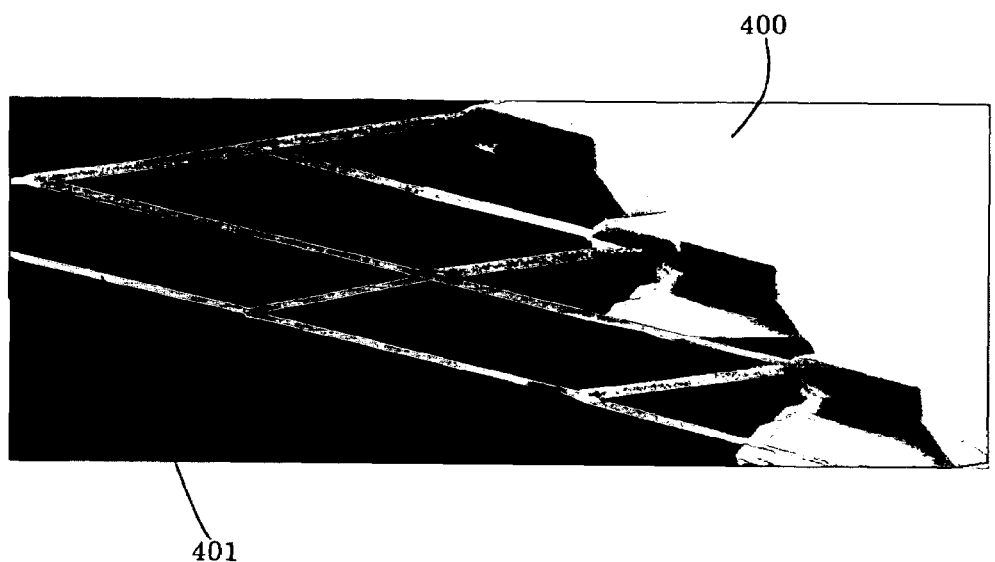
FIG. 5 is a perspective view of a fine coil (device) having a grid structure composed of fine wires according to an embodiment of the present invention.

FIG. 5 is a perspective view of a fine coil (device) having a grid structure composed of fine wires according to an embodiment of the present invention.

In this figure, reference numeral 400 indicates a fine coil base, and reference numeral 401 indicates a fine coil having a grid structure composed of fine wires. This device can also be formed in three-dimensional structure.

Figure 6:
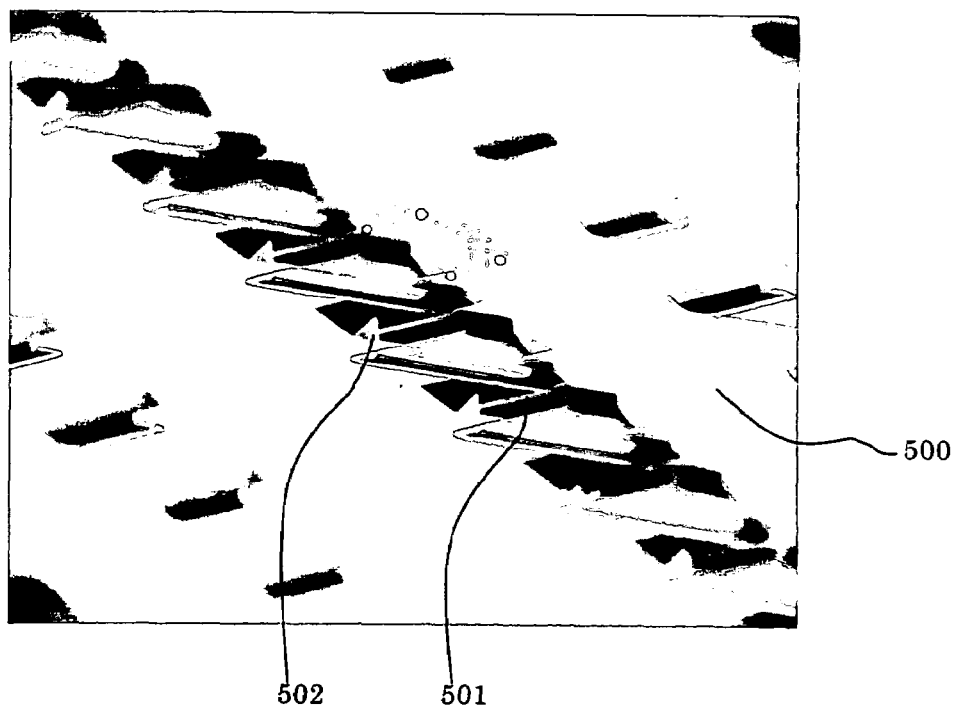
FIG. 6, according to an embodiment of the present invention, is a perspective view of an oscillator (device) having a tip supported by a plurality of fine wires and used to detect the temperature-dependent resistance variation.
Figure 7:
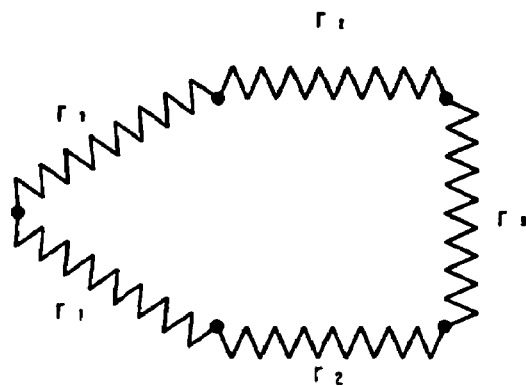
FIG. 7 is a drawing showing a resistance bridge in FIG. 6.

FIG. 6, according to an embodiment of the present invention, is a perspective view of an oscillator (device) having a tip supported by a plurality of fine wires and used to detect the temperature-dependent resistance variation. FIG. 7 is a drawing showing a resistance bridge thereof.

In this figure, reference numeral 500 indicates a cantilever support, reference numeral 501 indicates a plurality of fine wires, and reference numeral 502 indicates a tip.

In this embodiment, each of the cantilevers composed of the fine wires 501 is doped with boron to provide electrical conductivity. In addition, the resistance bridge shown in FIG. 7 is formed at the cantilever support 500. As a result, the resistance variation due to the temperature of the cantilever can be detected. Because of the significantly low heat capacity, this device can provide high sensitivity and response frequency. In FIG. 7, symbol $r_1$ represents the resistance of a plurality of the fine wire portions, and symbol $r_2$ and symbol $r_3$ represent the resistances of the cantilever support 500.

According to a method for producing the above devices shown in FIGS. 2 to 6, for example, single-crystal silicon is etched with potassium hydroxide (KOH) to provide a fine wire composed of a plurality of crystal faces. An example of such a fine wire is composed of two silicon {111} surfaces and a silicon {100} surface.

Silicon single-crystals have the {111} surface and its equivalent surfaces disposed in two or more directions. Therefore, depending on the combination of the crystal faces, a fine wire having different axial directions can be produced by etching the single-crystal silicon.

Furthermore, depending on the combination of fine wires having different orientations and fine wires parallel to each other, a one-dimensional line and various two or three-dimensional structures, such as a coil structure, a grid structure, a network structure, and an oscillator structure, can be achieved. Such a three-dimensional structure is produced using a multilayered structure composed of, for example, silicon and silicon oxide by masking appropriate areas according to whether the areas are to be etched or not.

The structures produced by the present invention can be used as a beam, a V-shaped coil, a V-shaped resistor, a grid structure, and a three-dimensionally linked structure. In any case, in known methods, these structures are made by hand or by combining plate-shaped components. In contrast, the present invention provides the following advantages: The structure can be miniaturized, a plurality of the structures can be produced at the same time, the structure can be produced with high uniformity, the structure can be produced three-dimensionally, the frequency of the structure can be increased, and oscillation loss of the structure can be decreased.

The above beam can be used as a stylus, a singly-supported beam, or a probe. The V-shaped coil can be used as a fine coil.

The V-shaped resistor can be used as a probe for temperature mapping in a minute area by utilizing the temperature-dependent resistance variation.

The grid structure can be used as a physical filter or a physical and chemical filter by modifying the surface thereof. In addition, the grid structure, which is a kind of sponge structure, can achieve a predetermined elasticity, and functions as a filter that selects light depending on the direction or the wavelength. Furthermore, when the structure is vibrated, the structure functions as an optical modulation element. The absorption of a specific substance can be detected as a change in vibration characteristics of the structure by combining the filter function of the specific substance with the oscillator function.

In the structure composed of fine wires, the inside of the fine wires is used as a waveguide for light or a waveguide for oscillation, thereby controlling the propagation of the light or the oscillation.

As described above, fine wires on the order of nano to micrometers can be achieved by wet etching utilizing the crystallinity of silicon etc., and a three-dimensional structure using the fine wires as elements can be achieved. This technology allows elements such as an oscillator, a net, a coil, a heat-generating loop, a filter, and a magnetic sensor on the order of microns to submicrons to be produced.

As a result, the oscillator can detect force or mass, the net can trap a sample having a specific particle size, the coil can generate a fine magnetic field or can detect such a magnetic field, and the heat-generating loop can measure the temperature distribution of a sample.

This method is applicable to mass production of a three-dimensional structure composed of millions to hundreds of millions of fine wires.

Figure 8:
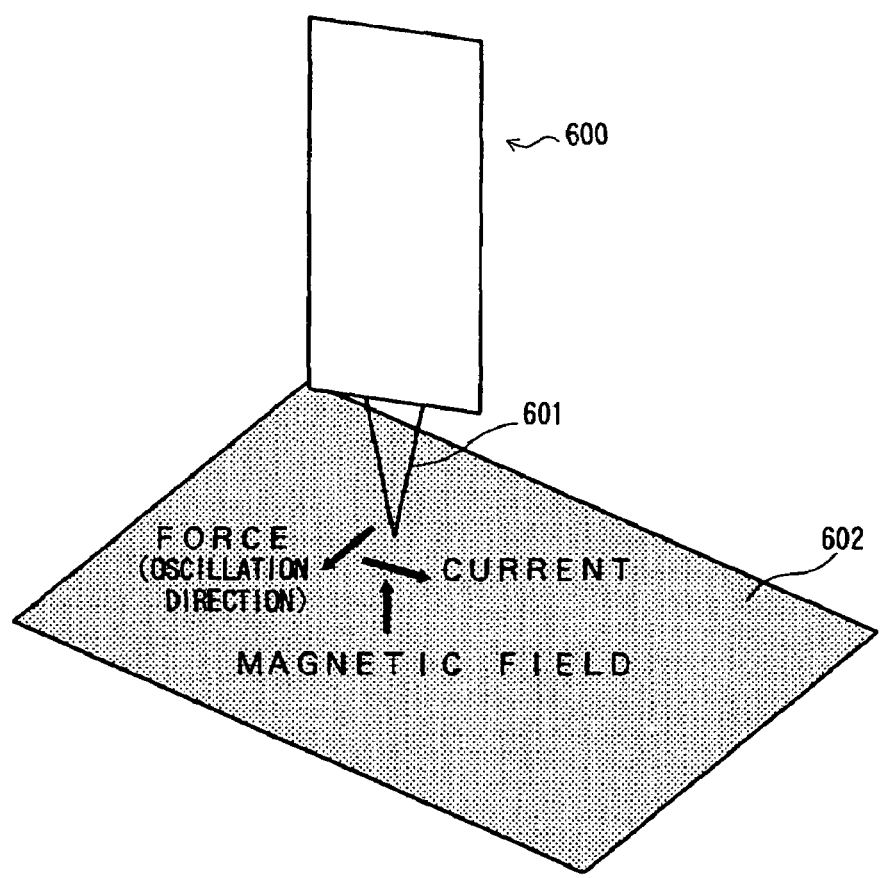
FIG. 8 is a schematic view of a fine coil (device) to which a modulation function can be added, according to an embodiment of the present invention.

FIG. 8 is a schematic view of a fine coil (device) to which a modulation function can be added, according to an embodiment of the present invention.

In this figure, reference numeral 600 indicates a fine coil support, reference numeral 601 indicates a fine coil composed of fine wires, and reference numeral 602 indicates a sample.

In this embodiment, when current flows in the fine coil 601 composed of fine wires, the fine coil 601 can detect the Lorentz force or its gradient due to the magnetic field of the sample 602 as a force applied in the oscillation direction.

This device allows a magnetic profile to be measured without using the characteristics of a magnetic tip. Furthermore, a modulation function such as modulation of the current, which cannot be added to known magnetic tips, can be added to this device.

The present invention is applicable to a scanning probe microscope, oscillation measurement, analysis of characteristics of surfaces and interfaces, an electric circuit, a mass detector, an electrical circuit network, a substance-trapping filter, and an elastic material. The present invention is also applicable to the measurements of temperature, the temperature distribution of electronic devices, and the temperature distribution and metabolism of biological materials.

In the following aspect of the present invention, the wording "a cantilever" generally represents a cantilever used in an atomic force microscope, and the wording "a probe" represents a probe which is not limited to the cantilever used in the atomic force microscope, but represents an element used for various applications such as mass detection and magnetic field detection.

Figure 9:
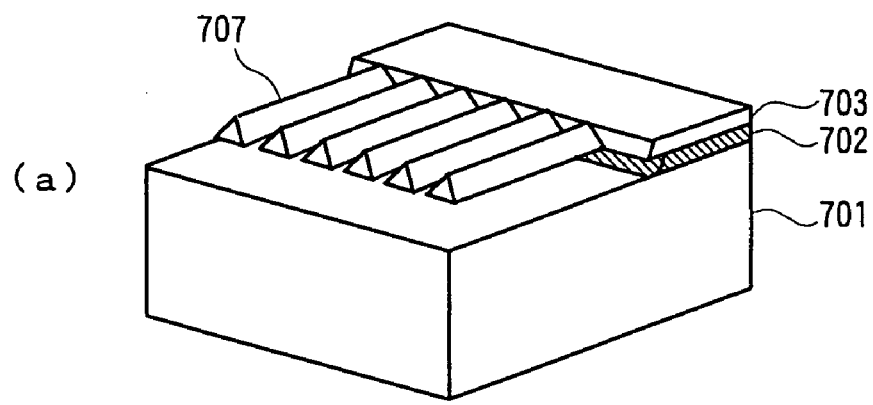
FIG. 9 shows cantilevers functioning as probes composed of silicon fine wires according to an embodiment of the present invention.
Figure 9:
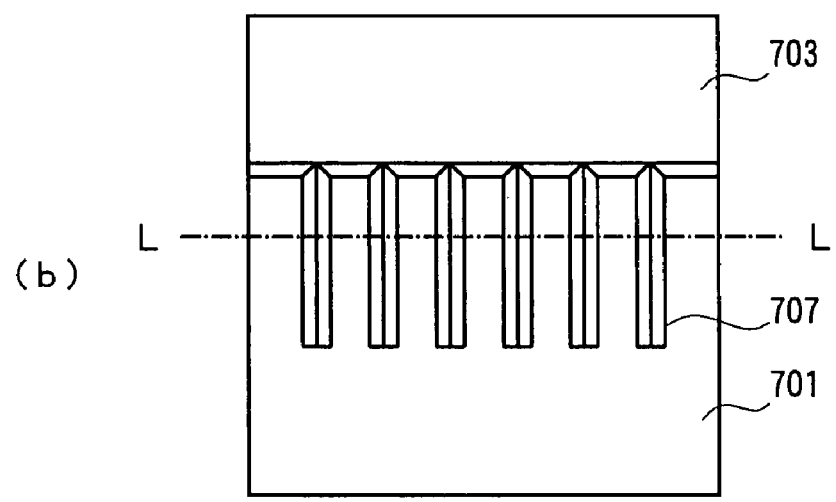
Figure 9:
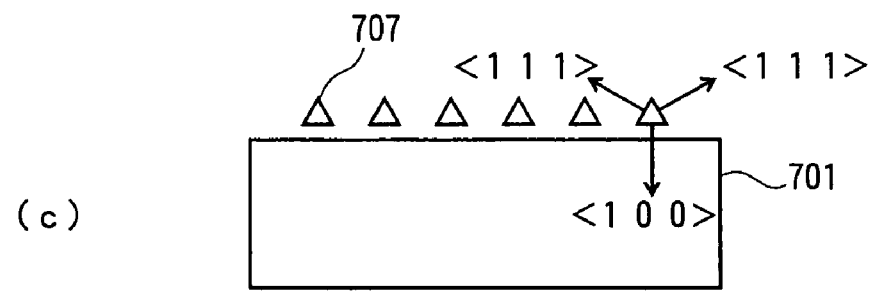

FIG. 9 shows cantilevers functioning as probes composed of silicon fine wires according to an embodiment of the present invention. FIG. 9(a) is a perspective view thereof, FIG. 9(b) is a plan view thereof, and FIG. 9(c) is a cross-sectional view taken along line L-L in FIG. 9(b).

In this figure, reference numeral 701 indicates a handling wafer, reference numeral 702 indicates a buried oxide film, reference numeral 703 indicates a silicon-on-insulator (SOI) layer, and reference numeral 707 indicates silicon fine wires (cantilevers composed of singly-supported beams), which are formed by utilizing the crystallinity of the SOI layer 703.

A method for producing the cantilevers (singly-supported beams composed of fine wires) will now be described with reference to FIGS. 10 to 14.

Figure 10:
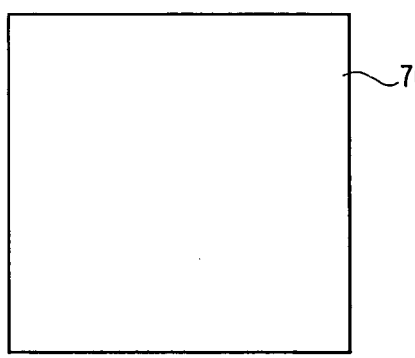
FIG. 10 shows a production process (No. 1) of the cantilevers (singly-supported beams composed of fine wires) shown in FIG. 9.
Figure 10:
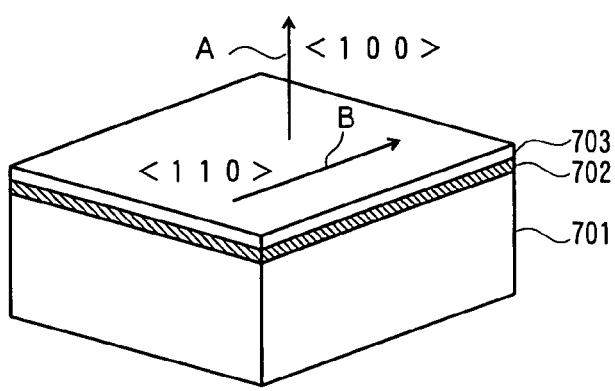
Figure 10:
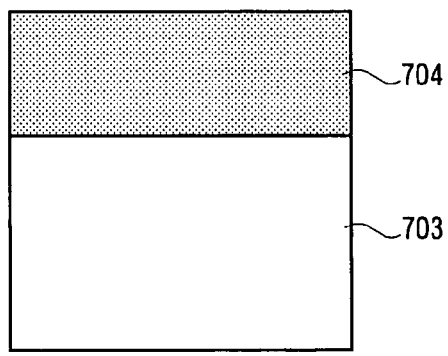
Figure 10:
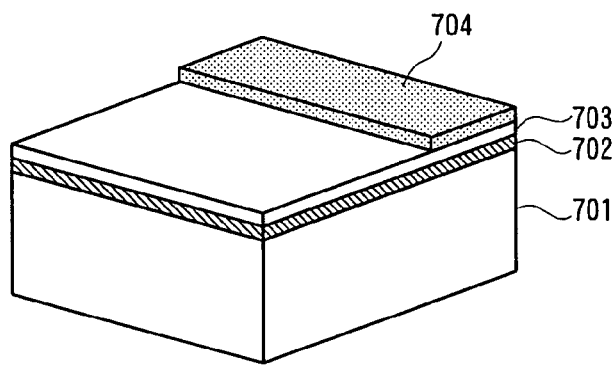
Figure 10:
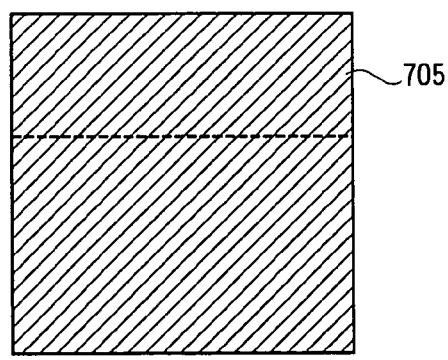
Figure 10:
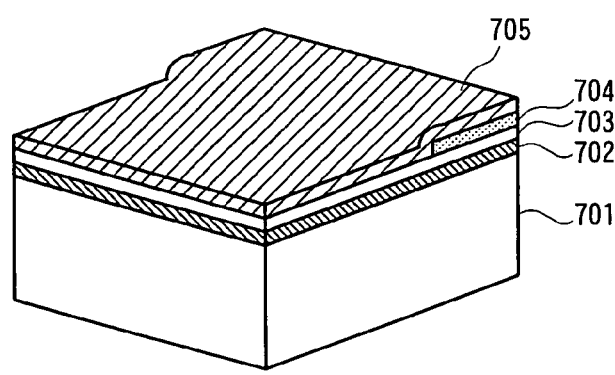

(1) FIG. 10(a-1) is a plan view and FIG. 10(a-2) is a perspective view. As shown in these figures, in Step S1, the buried oxide film 702 is formed on the handling wafer 701, and the SOI layer 703 is formed on the buried oxide film 702. Herein, arrow A indicates the <100> direction and arrow B indicates the <110> direction.

(2) FIG. 10(b-1) is a plan view and FIG. 10(b-2) is a perspective view. As shown in these figures, in Step S2, a silicon oxide ($SiO_2$) film 704 is formed on a part of the SOI layer 703.

(3) FIG. 10(c-1) is a plan view and FIG. 10(c-2) is a perspective view. As shown in these figures, in Step S3, a silicon nitride ($Si_3N_4$) film 705 is deposited thereon.

Figure 11:
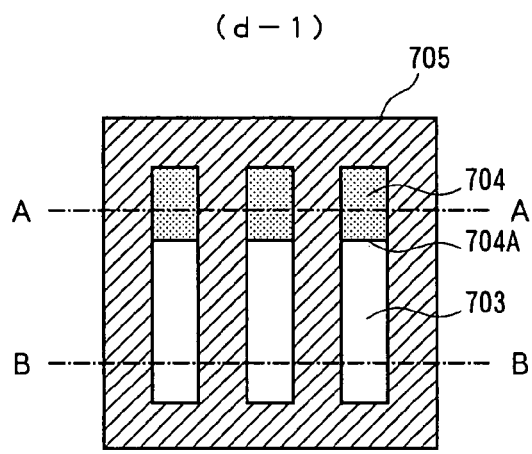
FIG. 11 shows a production process (No. 2) of the cantilevers (singly-supported beams composed of fine wires) shown in FIG. 9.
Figure 11:
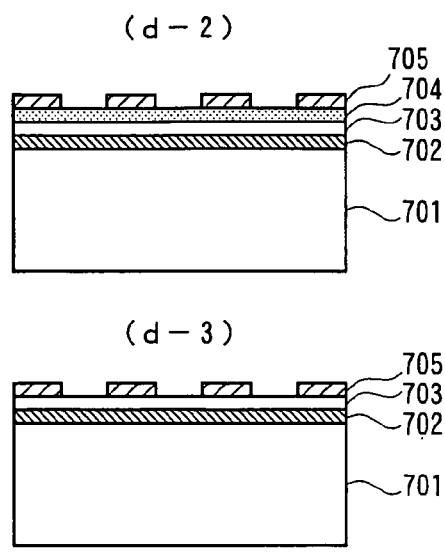
Figure 11:
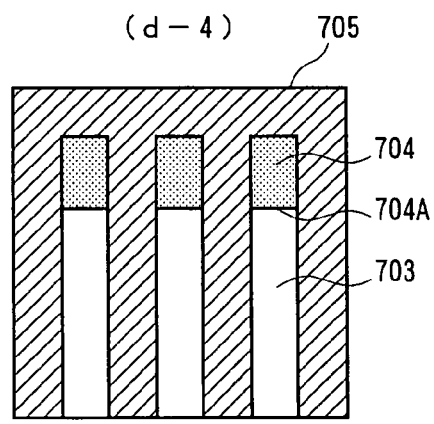
Figure 11:
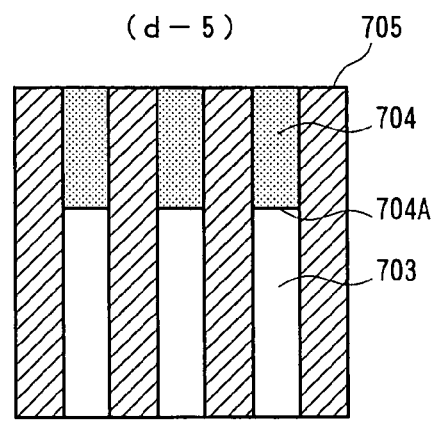
Figure 11:
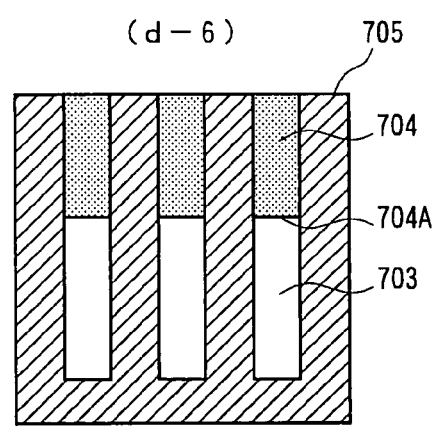

(4) FIG. 11(d-1) is a plan view, FIG. 11(d-2) is a cross-sectional view taken along line A-A in FIG. 11(d-1), and FIG. 11(d-3) is a cross-sectional view taken along line B-B in FIG. 11(d-1). As shown in these figures, in Step S4, the silicon nitride ($Si_3N_4$) film 705 is patterned to form parallel rectangular windows such that an edge 704A of the silicon oxide ($SiO_2$) film 704 appears in each window. The long sides of each rectangular window are parallel to the <110> direction.

As shown in FIG. 11(d-4), the windows may be opened at one end. As shown in FIG. 11(d-5), the windows may be opened at both ends. As shown in FIG. 11(d-6), the windows may be opened at the other end.

Figure 12:
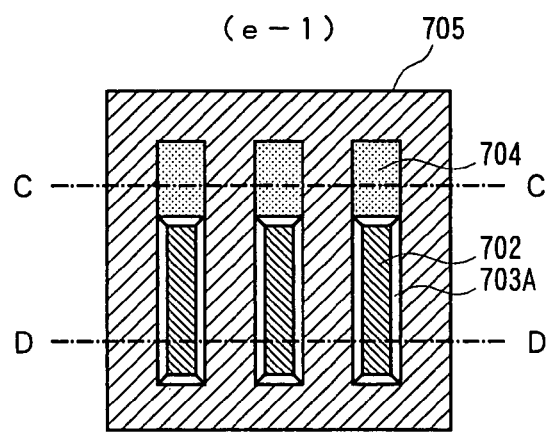
FIG. 12 shows a production process (No. 3) of the cantilevers (singly-supported beams composed of fine wires) shown in FIG. 9.
Figure 12:
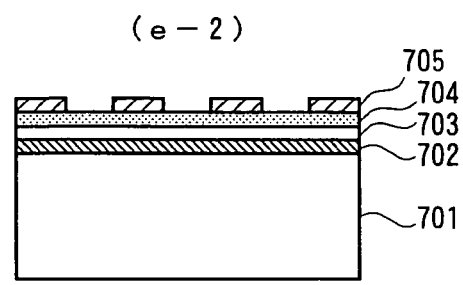
Figure 12:
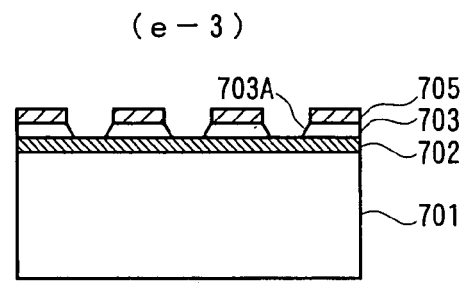
Figure 12:
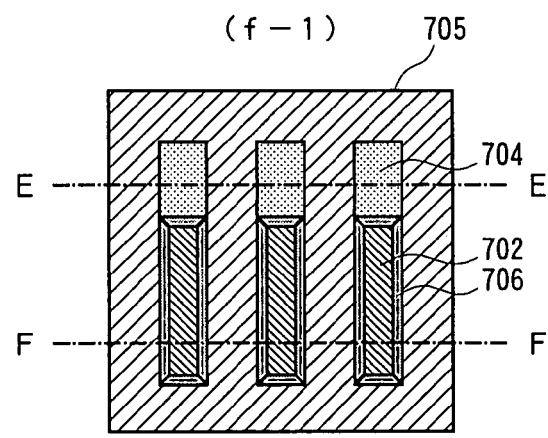
Figure 12:
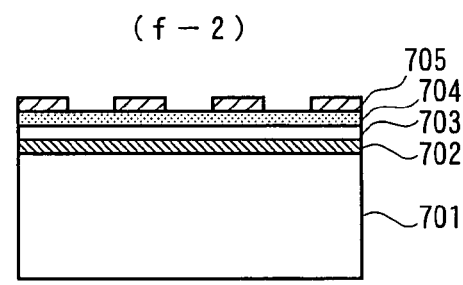
Figure 12:
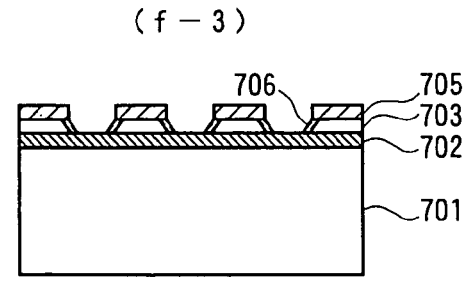

(5) FIG. 12(e-1) is a plan view, FIG. 12(e-2) is a cross-sectional view taken along line C-C in FIG. 12(e-1), and FIG. 12(e-3) is a cross-sectional view taken along line D-D in FIG. 12(e-1). As shown in these figures, in Step S5, the SOI layer 703 that is exposed in the windows is subjected to wet etching with an alkaline solution using the silicon nitride ($Si_3N_4$) film 705 as the mask, thus forming recesses defined by <111> surfaces 703A.

(6) FIG. 12(f-1) is a plan view, FIG. 12(f-2) is a cross-sectional view taken along line E-E in FIG. 12(f-1), and FIG. 12(f-3) is a cross-sectional view taken along line F-F in FIG. 12(f-1). As shown in these figures, in Step S6, the resultant wafer is thermally oxidized. As a result, the exposed <111> surfaces 703A of the silicon are protected with a thermally-oxidized film 706.

Figure 13:
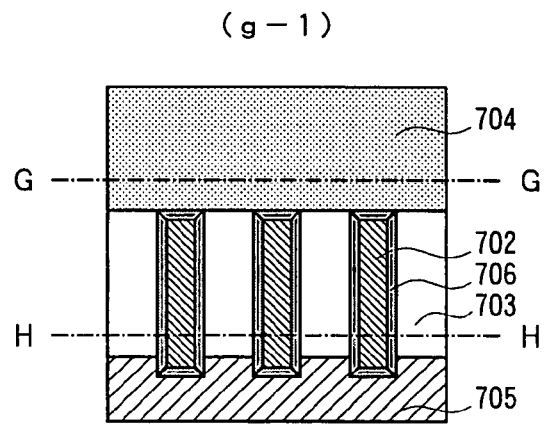
FIG. 13 shows a production process (No. 4) of the cantilevers (singly-supported beams composed of fine wires) shown in FIG. 9.
Figure 13:
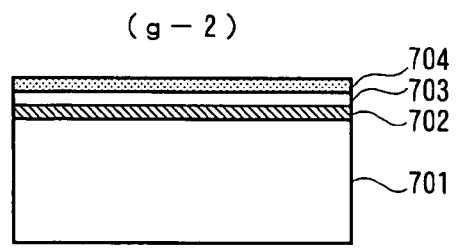
Figure 13:
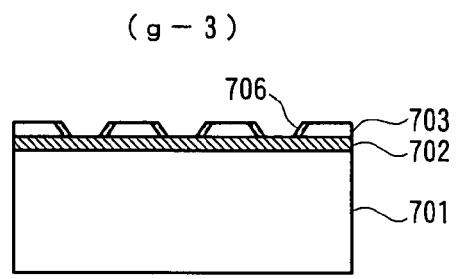
Figure 13:
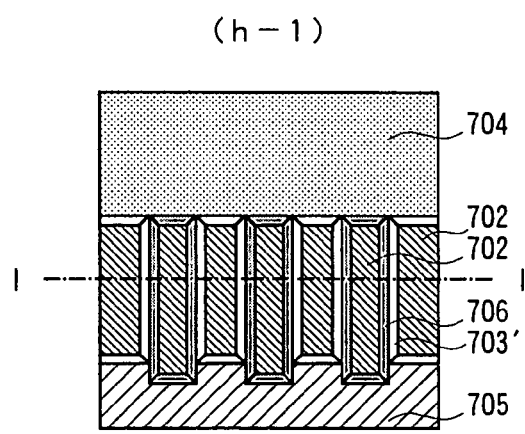
Figure 13:
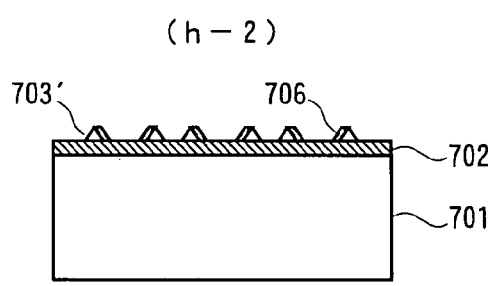

(7) FIG. 13(g-1) is a plan view, FIG. 13(g-2) is a cross-sectional view taken along line G-G in FIG. 13(g-1), and FIG. 13(g-3) is a cross-sectional view taken along line H-H in FIG. 13(g-1). As shown in these figures, in Step S7, a part of the silicon nitride ($Si_3N_4$) film 705 is removed. Although the figures show a case in which the silicon nitride ($Si_3N_4$) film 705 partly remains, the entire silicon nitride ($Si_3N_4$) film 705 may be removed.

(8) FIG. 13(h-1) is a plan view and FIG. 13(h-2) is a cross-sectional view taken along line I-I in FIG. 13(h-1). As shown in these figures, in Step S8, second wet etching is performed using the thermally-oxidized film 706 as the mask. Consequently, as shown in FIG. 13(h-2), SOI layers 703' having a substantially triangular cross-section are formed on the buried oxide film 702, one surface of each SOI layer 703' being protected with the thermally-oxidized film 706.

Figure 14:
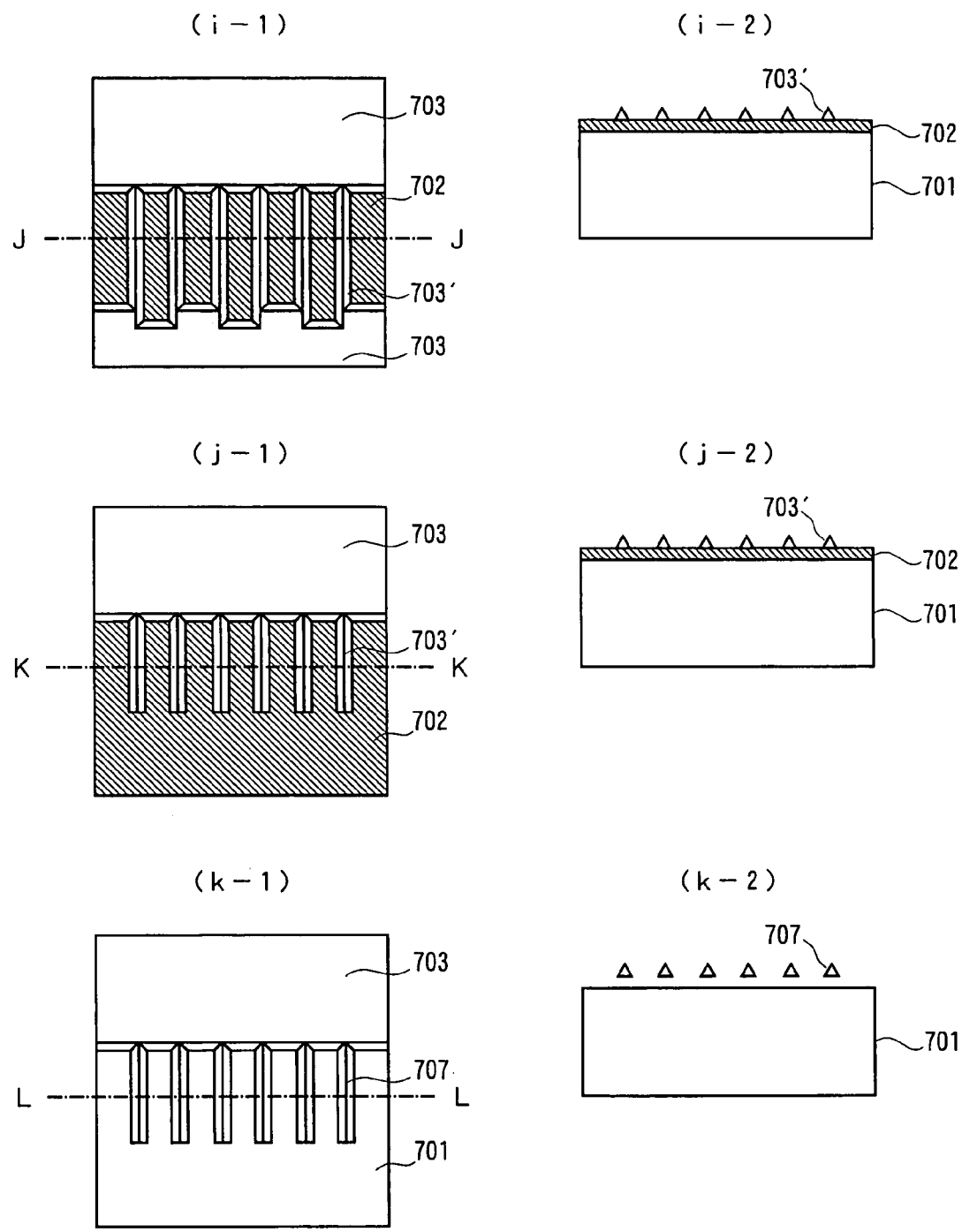
FIG. 14 shows a production process (No. 5) of the cantilevers (singly-supported beams composed of fine wires) shown in FIG. 9.

(9) FIG. 14(i-1) is a plan view and FIG. 14(i-2) is a cross-sectional view taken along line J-J in FIG. 14(i-1). As shown in these figures, in Step S9, the thermally-oxidized film 706 formed in Step S6, the silicon nitride ($Si_3N_4$) film 705 partly left in Step S7, and the silicon oxide ($SiO_2$) film 704 are removed. As a result, the wire-shaped SOI layers 703' having a substantially triangular cross-section are formed.

(10) FIG. 14(j-1) is a plan view and FIG. 14(j-2) is a cross-sectional view taken along line K-K in FIG. 14(j-1). As shown in these figures, in Step S10, the wire-shaped SOI layers 703' [cantilevers (singly-supported beams)] having a substantially triangular cross-section are processed to have a predetermined length [for example, by reactive ion etching (RIE)].

(11) Finally, FIG. 14(k-1) is a plan view and FIG. 14(k-2) is a cross-sectional view taken along line L-L in FIG. 14(k-1). As shown in these figures, in Step S11, the buried oxide film 702 disposed under the wire-shaped SOI layers 703' having a substantially triangular cross-section is removed to separate the SOI layers 703'. Thus, silicon fine wires [cantilevers (singly-supported beams)] 707 can be formed from the wire-shaped SOI layers 703' having a substantially triangular cross-section. The silicon fine wires 707 are formed by utilizing the crystallinity of a single-crystal material, and each of the silicon fine wire 707 has the same length.

As described above, the method for producing a three-dimensional structure composed of silicon fine wires includes the steps of preparing an SOI substrate having a surface composed of the {100} surface of silicon single-crystals thereon; forming a silicon oxide film 704 on a part of an SOI layer 703 of the SOI substrate; forming a silicon nitride film 705 on the SOI layer 703 and the silicon oxide film 704; removing a part of the silicon nitride film 705 to expose the SOI layer 703 such that elongated shapes are repeatedly arranged side-by-side so as to be parallel to the <110> direction; removing the exposed SOI layer 703 by wet etching with an alkaline solution; thermally oxidizing the {111} surfaces 703A exposed by the wet etching to form a thermally-oxidized film 706; removing a part of the remaining silicon nitride film 705; wet etching the newly exposed SOI layer 703 with an alkaline solution; removing the thermally-oxidized film 706 of the resultant SOI layers 703' having a substantially triangular cross-section, the remaining silicon nitride film 705, and the silicon oxide film 704; forming an array of silicon fine wires; processing the silicon fine wires such that the silicon fine wires have a predetermined length; and removing a buried oxide film 702 of the SOI substrate to form silicon fine wires [cantilevers (singly-supported beams composed of fine wires)] 707 that can be independently oscillated.

Figure 15:
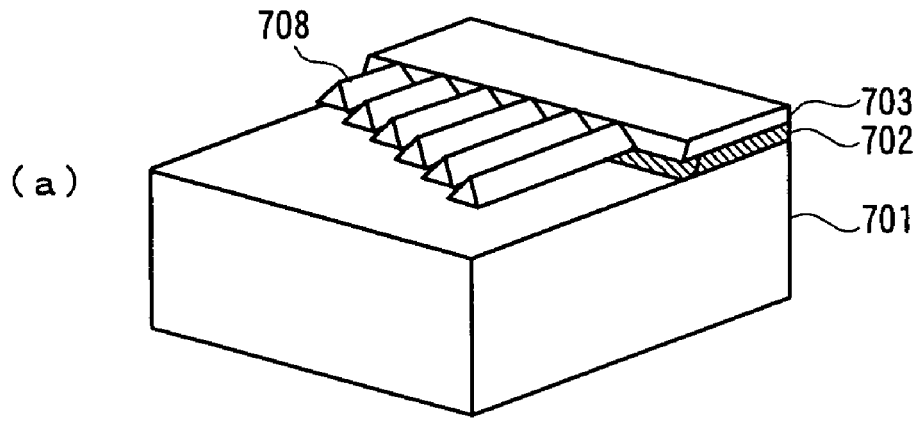
FIG. 15 shows cantilevers functioning as probes composed of silicon fine wires according to a first modification of the embodiment of the present invention.
Figure 15:
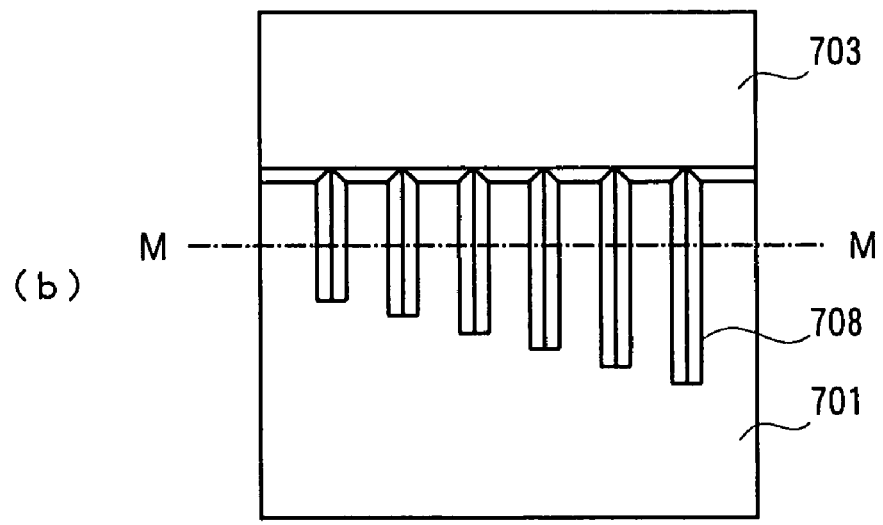
Figure 15:
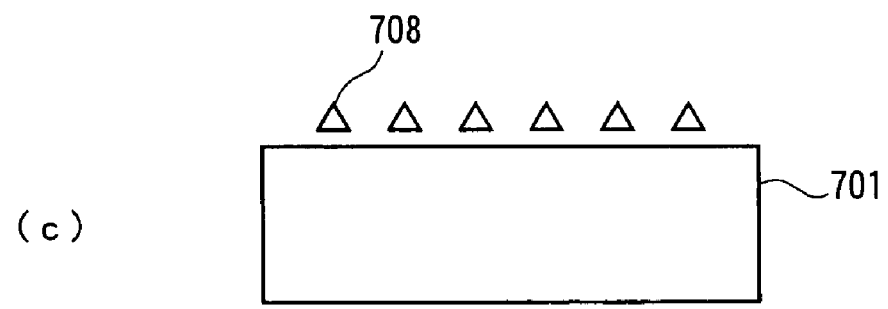

FIG. 15 shows cantilevers functioning as probes composed of silicon fine wires according to a first modification of the embodiment of the present invention. FIG. 15(a) is a perspective view thereof, FIG. 15(b) is a plan view thereof, and FIG. 15(c) is a cross-sectional view taken along line M-M in FIG. 15(b).

In this embodiment, proximal ends of the silicon fine wires [cantilevers (singly-supported beams composed of fine wires)] 708 are aligned. However, the silicon fine wires 708 are formed such that the length of each fine wire gradually changes from one to the next. Other structures are the same as those of the above silicon fine wires.

Figure 16:
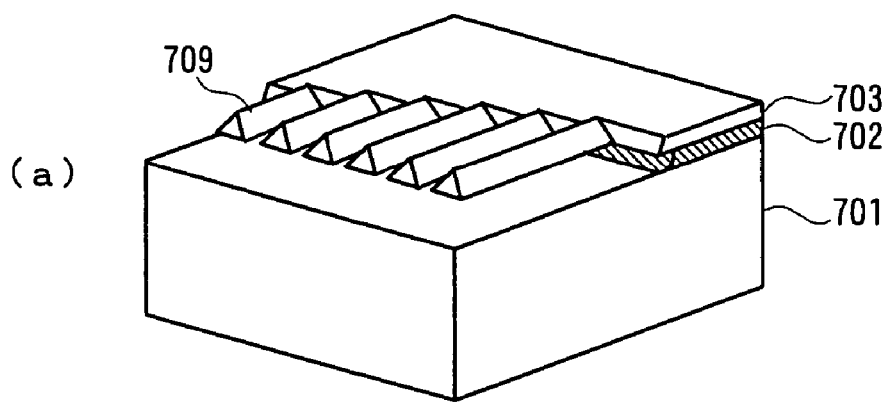
FIG. 16 shows cantilevers functioning as probes composed of silicon fine wires according to a second modification of the embodiment of the present invention.
Figure 16:
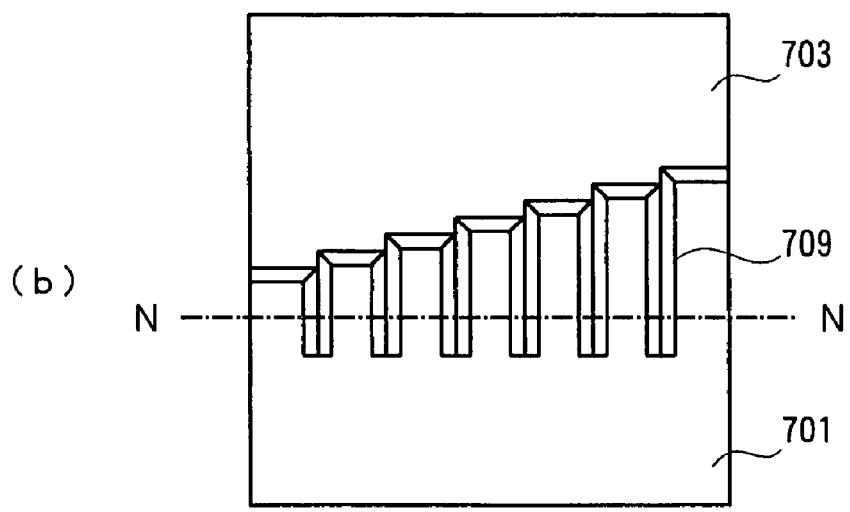
Figure 16:
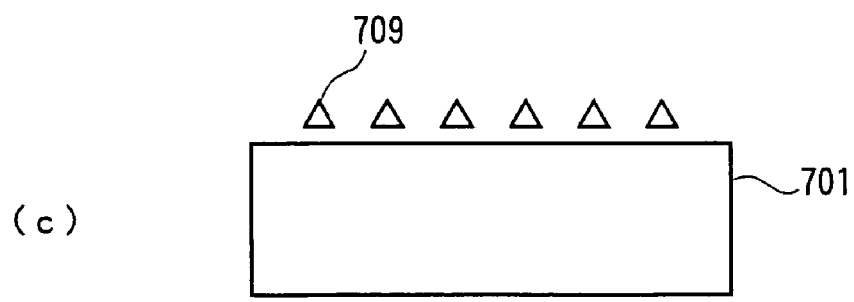

FIG. 16 shows cantilevers functioning as probes composed of silicon fine wires according to a second modification of the embodiment of the present invention. FIG. 16(a) is a perspective view thereof, FIG. 16(b) is a plan view thereof, and FIG. 16(c) is a cross-sectional view taken along line N-N in FIG. 16(b).

In this embodiment, distal ends of silicon fine wires [cantilevers (singly-supported beams composed of fine wires)] 709 are formed on the same line, whereas the proximal ends of the silicon fine wires form a slanted shape. As a result, the length of each fine wire gradually changes from one to the next. Other structures are the same as those of the above silicon fine wires.

As described above, according to the present invention, singly-supported beams composed of silicon fine wires that suffer no damage such as crystal defects can be formed by utilizing the crystallinity of silicon, in contrast to a known example in which cantilevers are formed by anisotropic etching (such as RIE) regardless of the crystallinity of silicon.

Figure 17:
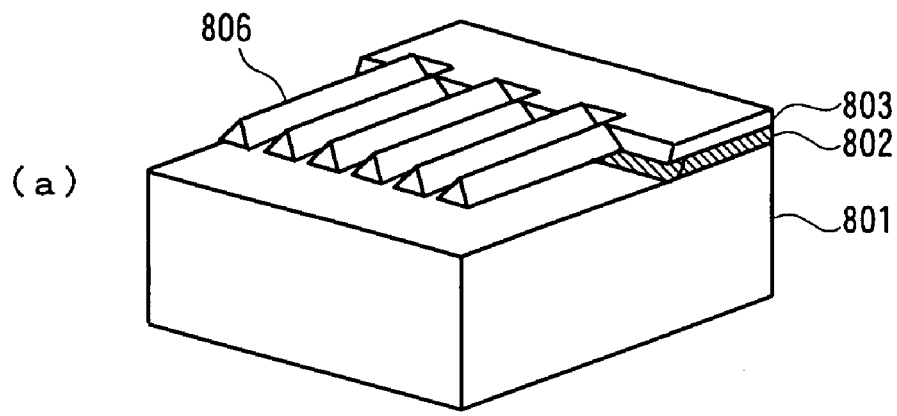
FIG. 17 shows cantilevers functioning as probes composed of silicon fine wires according to an embodiment of the present invention.
Figure 17:
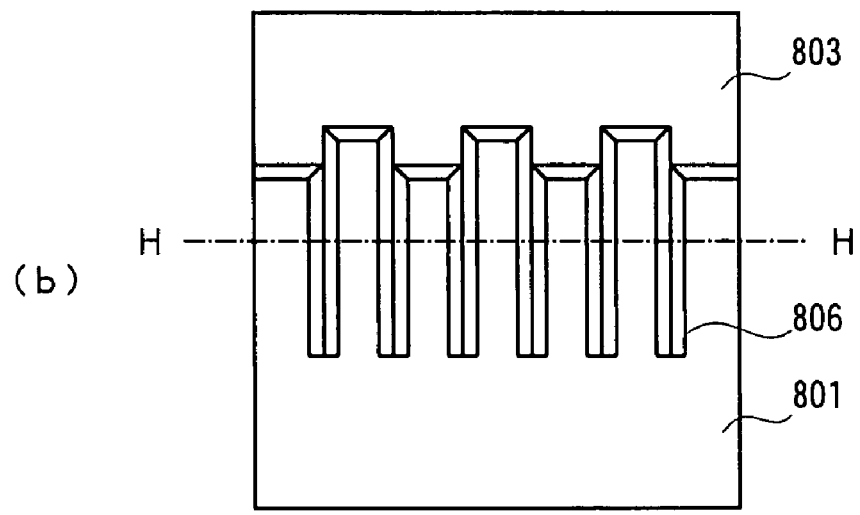
Figure 17:
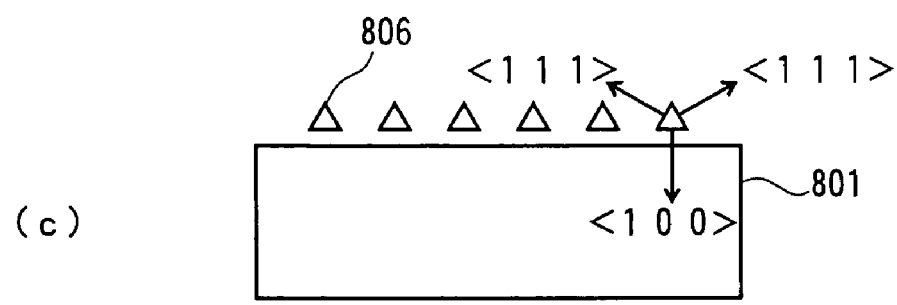

FIG. 17 shows cantilevers functioning as probes composed of silicon fine wires according to an embodiment of the present invention. FIG. 17(a) is a perspective view thereof, FIG. 17(b) is a plan view thereof, and FIG. 17(c) is a cross-sectional view taken along line H-H in FIG. 17(b).

In this figure, reference numeral 801 indicates a handling wafer, reference numeral 802 indicates a buried oxide film, reference numeral 803 indicates an SOI layer, and reference numeral 806 indicates silicon fine wires (cantilevers composed of singly-supported beams), which are formed by utilizing the crystallinity of the SOI layer 803.

A method for producing the cantilevers (singly-supported beams in which proximal ends of the fine wires have different shapes on the two lateral sides of each fine wire) will now be described with reference to FIGS. 18 to 20.

Figure 18:
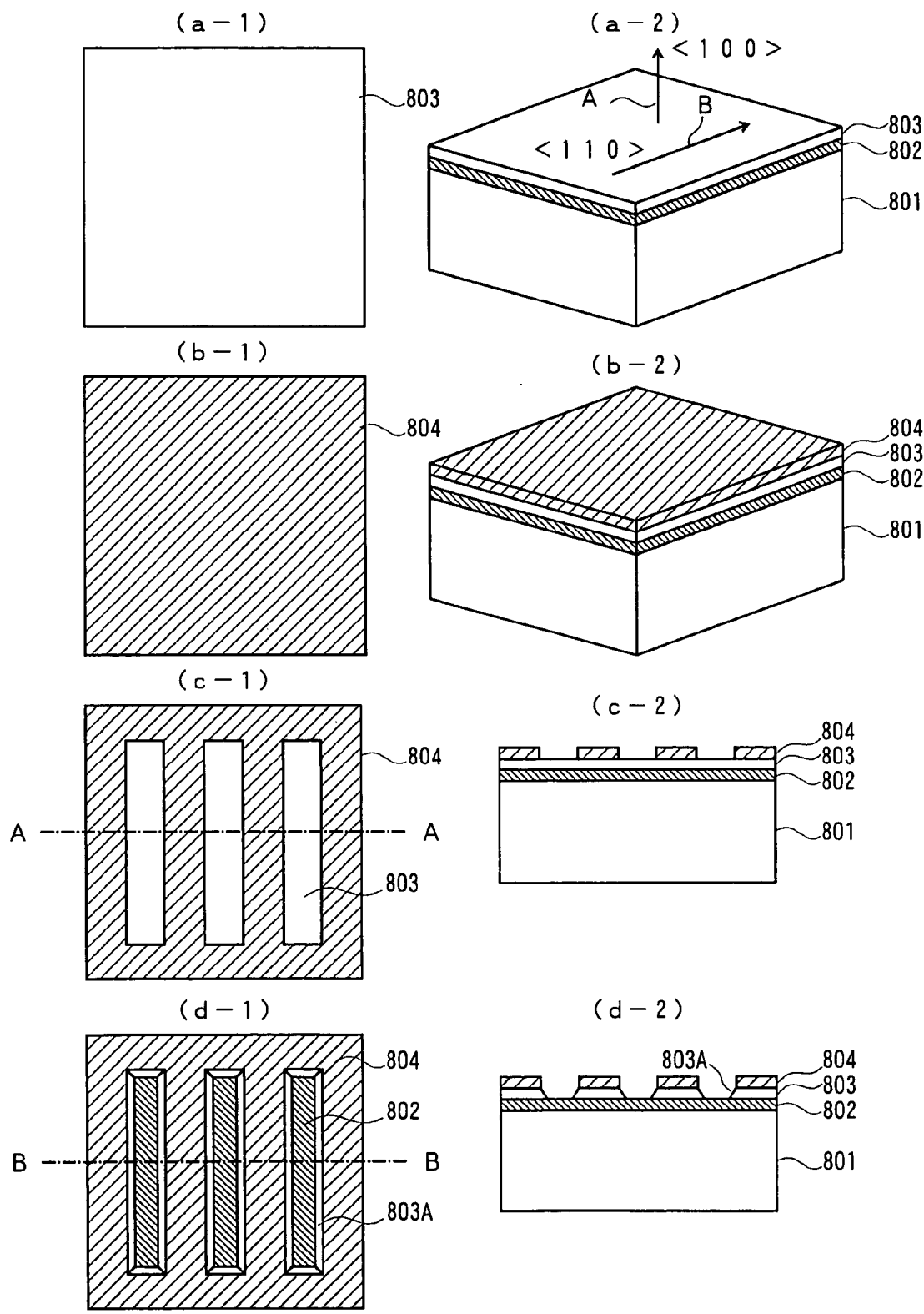
FIG. 18 shows a production process (No. 1) of the cantilevers functioning as probes composed of silicon fine wires shown in FIG. 17.

(1) FIG. 18(a-1) is a plan view and FIG. 18(a-2) is a perspective view. As shown in these figures, in Step S1, the buried oxide film 802 is formed on the handling wafer 801, and the SOI layer 803 is formed on the buried oxide film 802. Herein, arrow A indicates the <100> direction and arrow B indicates the <110> direction.

(2) FIG. 18(b-1) is a plan view and FIG. 18(b-2) is a perspective view. As shown in these figures, in Step S2, a silicon nitride ($Si_3N_4$) film 804 is formed on the SOI layer 803.

(3) FIG. 18(c-1) is a plan view and FIG. 18(c-2) is a cross-sectional view taken along line A-A in FIG. 18(c-1). As shown in these figures, in Step S3, the silicon nitride ($Si_3N_4$) film 804 is patterned to form parallel rectangular windows such that the SOI layer 803 appears in each window. The long sides of the rectangular windows are parallel to the <110> direction.

(4) FIG. 18(d-1) is a plan view and FIG. 18(d-2) is a cross-sectional view taken along line B-B in FIG. 18(d-1). As shown in these figures, in Step S4, wet etching is performed with an alkaline solution using the silicon nitride ($Si_3N_4$) film 804 as the mask, thus forming recesses defined by <111> surfaces 803A.

Figure 19:
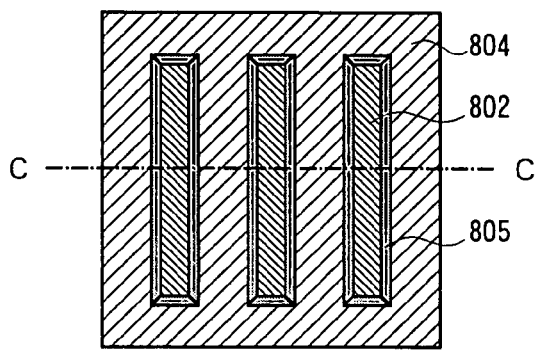
FIG. 19 shows a production process (No. 2) of the cantilevers functioning as probes composed of silicon fine wires shown in FIG. 17.
Figure 19:
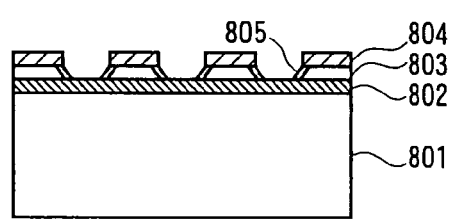
Figure 19:
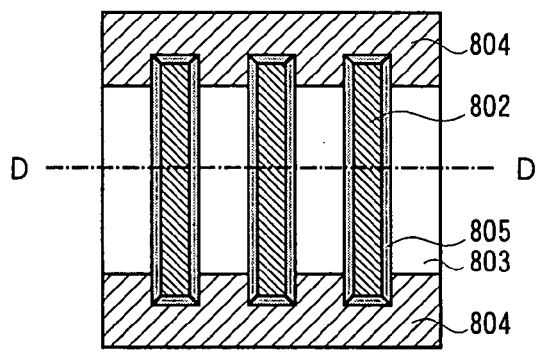
Figure 19:
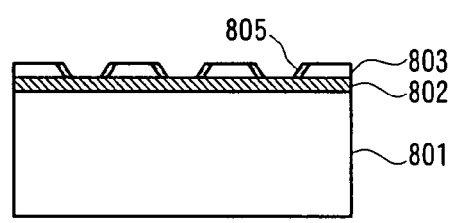
Figure 19:
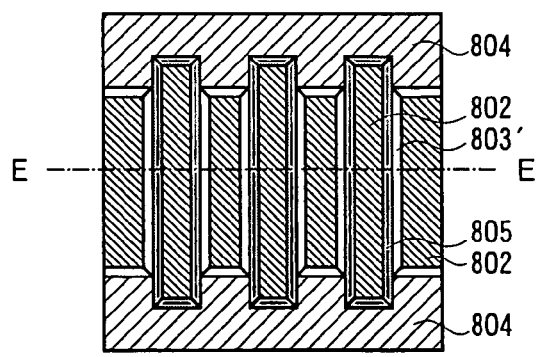
Figure 19:
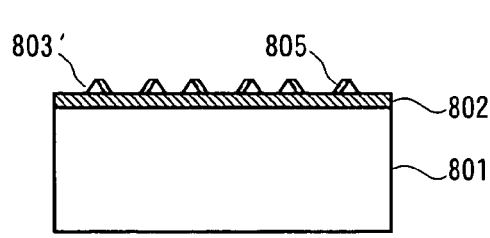

(5) FIG. 19(e-1) is a plan view and FIG. 19(e-2) is a cross-sectional view taken along line C-C in FIG. 19(e-1). As shown in these figures, in Step S5, the resultant wafer is thermally oxidized. As a result, the exposed <111> surfaces 803A of the silicon are protected with a thermally-oxidized film 805.

(6) FIG. 19(f-1) is a plan view and FIG. 19(f-2) is a cross-sectional view taken along line D-D in FIG. 19(f-1). As shown in these figures, in Step S6, the silicon nitride ($Si_3N_4$) film 804 is partly removed such that the silicon nitride ($Si_3N_4$) film 804 remains at both ends of the rectangular windows.

(7) FIG. 19(g-1) is a plan view and FIG. 19(g-2) is a cross-sectional view taken along line E-E in FIG. 19(g-1). As shown in these figures, in Step S7, second wet etching is performed using the thermally-oxidized film 805 as the mask. Consequently, SOI layers 803' [singly-supported beams in which proximal ends of the fine wires functioning as probes have different shapes on the two lateral sides of each fine wire] having a substantially triangular cross-section are formed on the buried oxide film 802, one surface of each SOI layer 803' being protected with the thermally-oxidized film 805.

Figure 20:
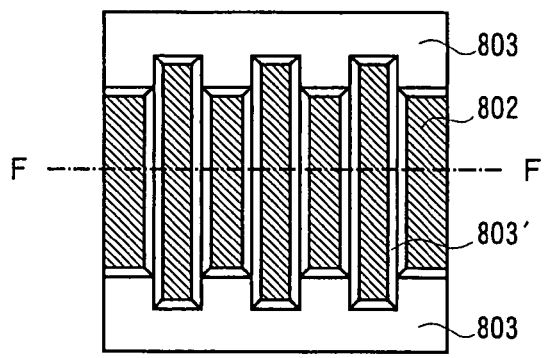
FIG. 20 shows a production process (No. 3) of the cantilevers functioning as probes composed of silicon fine wires shown in FIG. 17.
Figure 20:
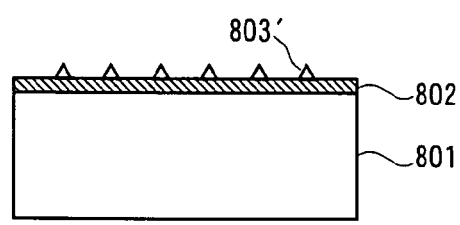
Figure 20:
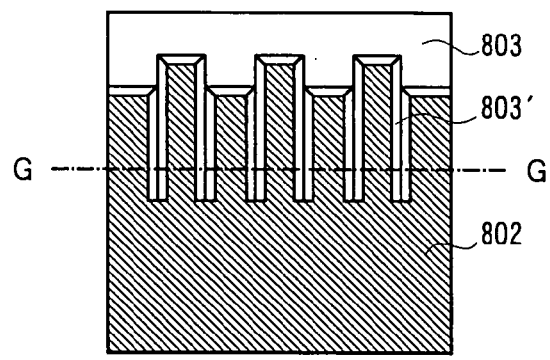
Figure 20:
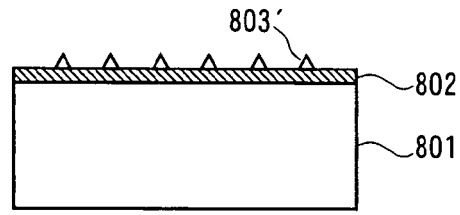
Figure 20:
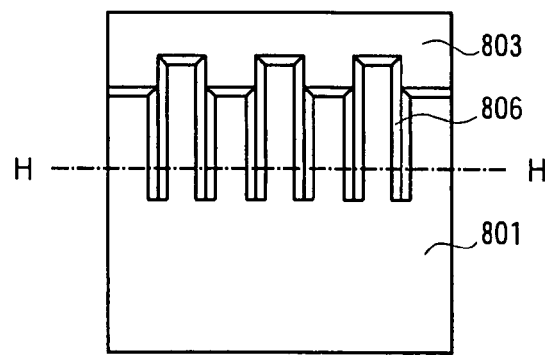
Figure 20:
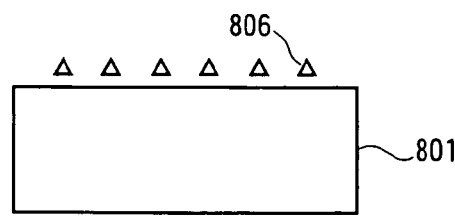

(8) FIG. 20(h-1) is a plan view and FIG. 20(h-2) is a cross-sectional view taken along line F-F in FIG. 20(h-1). As shown in these figures, in Step S8, the thermally-oxidized film 805 formed in Step S5 and the silicon nitride ($Si_3N_4$) film 804 remaining at both ends are removed. As a result, the wire-shaped SOI layers 803' [singly-supported beams in which the proximal ends of the fine wires have different shapes on the two lateral sides of each fine wire] having a substantially triangular cross-section are formed.

(9) FIG. 20(i-1) is a plan view and FIG. 20(i-2) is a cross-sectional view taken along line G-G in FIG. 20(i-1). As shown in these figures, in Step S9, the wire-shaped SOI layers 803' having a substantially triangular cross-section are processed by, for example, RIE so as to have a predetermined length.

(10) Finally, FIG. 20(j-1) is a plan view and FIG. 20(j-2) is a cross-sectional view taken along line H-H in FIG. 20(j-1). As shown in these figures, in Step S10, the buried oxide film 802 disposed under the wire-shaped SOI layers 803' having a substantially triangular cross-section is removed. Then, the wire-shaped SOI layers 803' having a substantially triangular cross-section are separated from the handling wafer 801 to form singly-supported beams 806 in which the proximal ends of the fine wires have different shapes on the two lateral sides of each fine wire.

Figure 21:
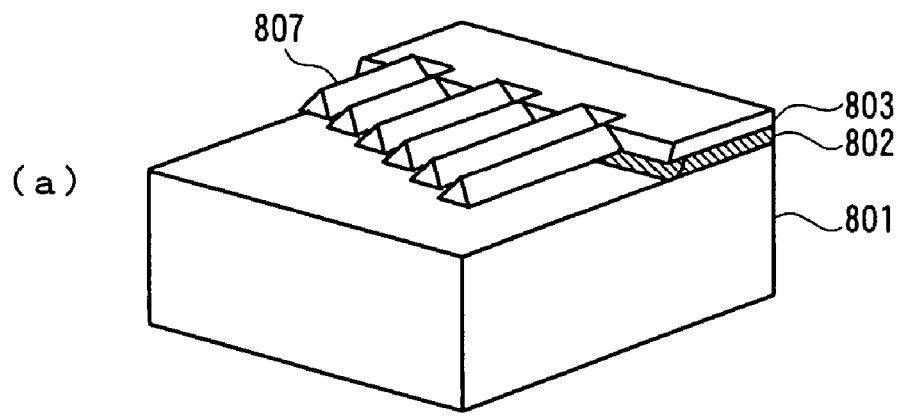
FIG. 21 shows cantilevers functioning as probes composed of silicon fine wires according to a modification of the embodiment of the present invention.
Figure 21:
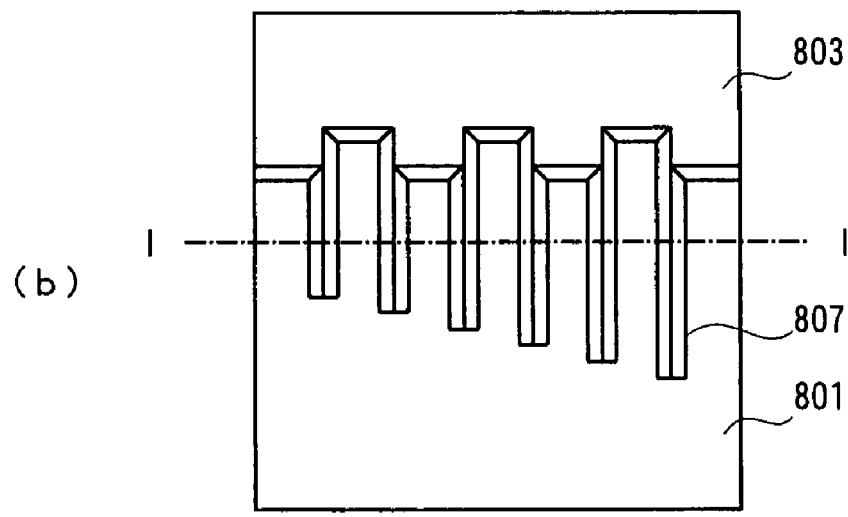
Figure 21:
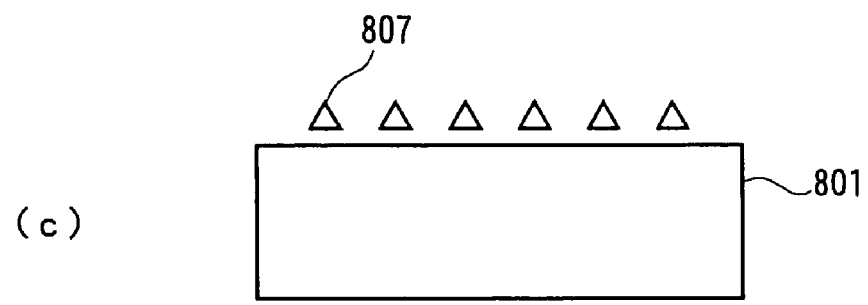

FIG. 21 shows cantilevers functioning as probes composed of silicon fine wires according to a modification of the embodiment of the present invention. FIG. 21(a) is a perspective view thereof, FIG. 21(b) is a plan view thereof, and FIG. 21(c) is a cross-sectional view taken along line I-I in FIG. 21(b).

In this embodiment, proximal ends of silicon fine wires [cantilevers (singly-supported beams composed of fine wires)] 807 have different shapes on the two lateral sides of each fine wire. Furthermore, the silicon fine wires [cantilevers (singly-supported beams composed of fine wires)] 807 are formed such that the length of each fine wire gradually changes from one to the next. Other structures are the same as those of the above silicon fine wires.

As described above, the singly-supported beams 806 and 807 in which the proximal ends of the fine wires functioning as probes have different shapes on the two lateral sides of each fine wire can be produced inexpensively by a simple process that omits a step of forming a silicon oxide film. These singly-supported beams have a durable structure because the proximal ends of the singly-supported beams have an asymmetrical shape. Accordingly, singly-supported beams having durability against aging, not being easily broken, and utilizing the crystallinity of silicon can be formed.

Figure 22:
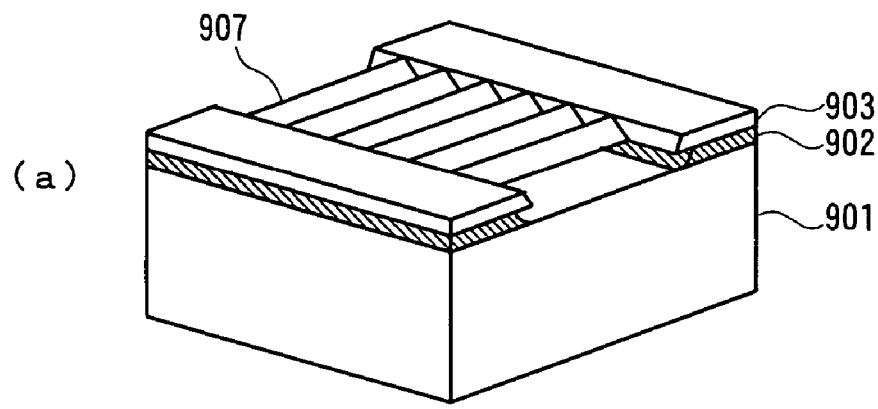
FIG. 22 shows doubly-supported beams functioning as probes composed of silicon fine wires according to an embodiment of the present invention.
Figure 22:
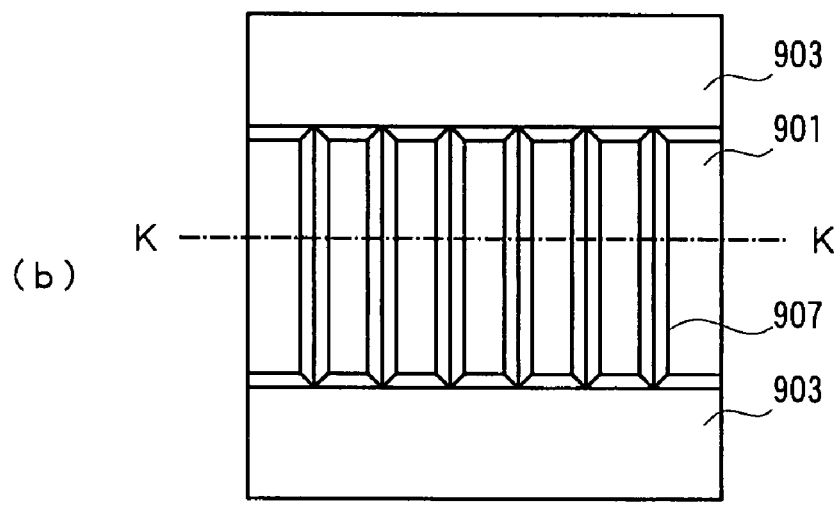
Figure 22:
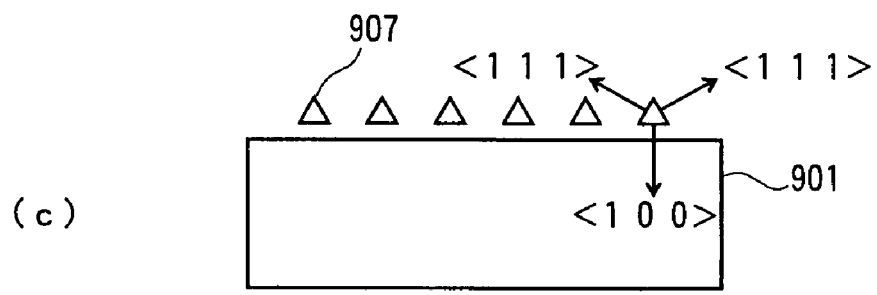

FIG. 22 shows doubly-supported beams functioning as probes composed of silicon fine wires according to an embodiment of the present invention. FIG. 22(a) is a perspective view thereof, FIG. 22(b) is a plan view thereof, and FIG. 22(c) is a cross-sectional view taken along line K-K in FIG. 22(b).

In this figure, reference numeral 901 indicates a handling wafer, reference numeral 902 indicates a buried oxide film, reference numeral 903 indicates an SOI layer, and reference numeral 907 indicates silicon fine wires (doubly-supported beams), which are formed by utilizing the crystallinity of the SOI layer 903.

A method for producing the doubly-supported beams composed of fine wires will now be described with reference to FIGS. 23 to 26.

Figure 23:
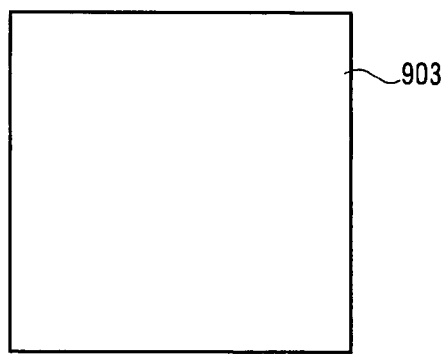
FIG. 23 shows a production process (No. 1) of the doubly-supported beams functioning as probes composed of silicon fine wires shown in FIG. 22.
Figure 23:
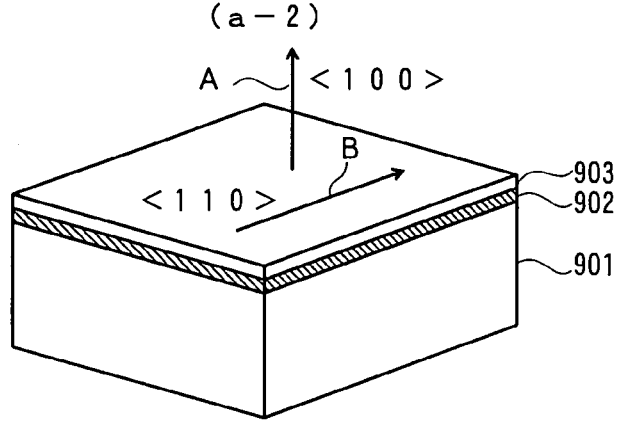
Figure 23:
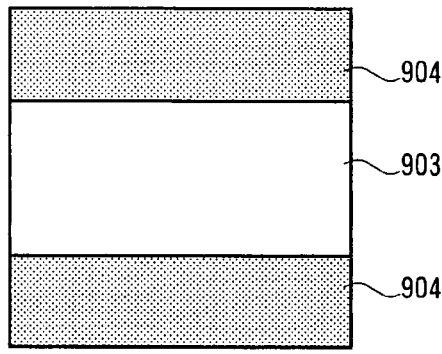
Figure 23:
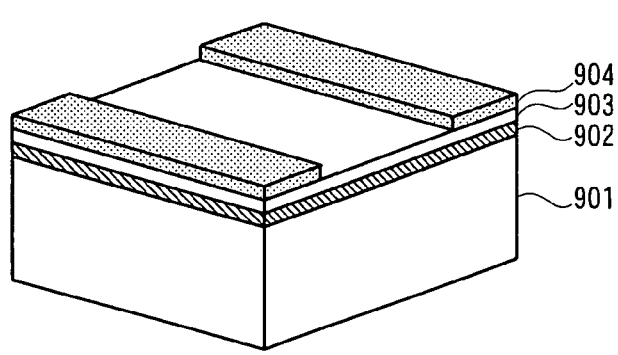
Figure 23:
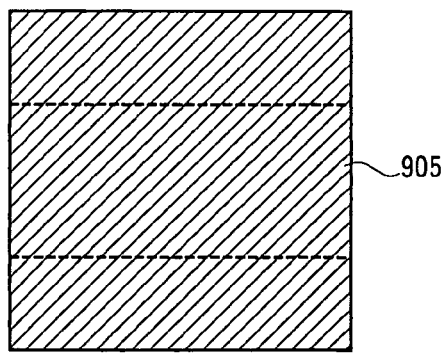
Figure 23:
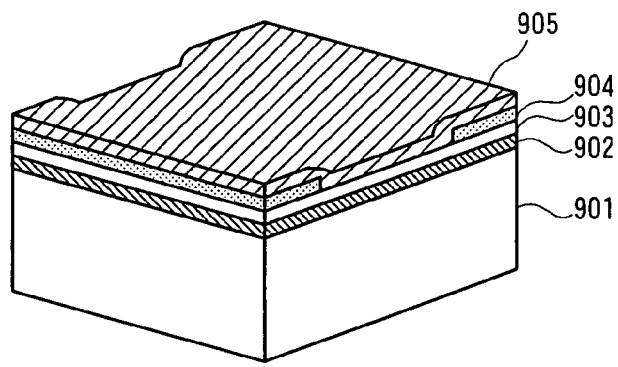

(1) FIG. 23(a-1) is a plan view and FIG. 23(a-2) is a perspective view. As shown in these figures, in Step S1, the buried oxide film 902 is formed on the handling wafer 901, and the SOI layer 903 is formed on the buried oxide film 902. Herein, arrow A indicates the <100> direction and arrow B indicates the <110> direction.

(2) FIG. 23(b-1) is a plan view and FIG. 23(b-2) is a perspective view. As shown in these figures, in Step S2, a silicon oxide ($SiO_2$) film 904 is formed by patterning both ends of the SOI layer 903.

(3) FIG. 23(c-1) is a plan view and FIG. 23(c-2) is a perspective view of FIG. 23(c-1). As shown in these figures, in Step S3, a silicon nitride ($Si_3N_4$) film 905 is deposited on the entire surface.

Figure 24:
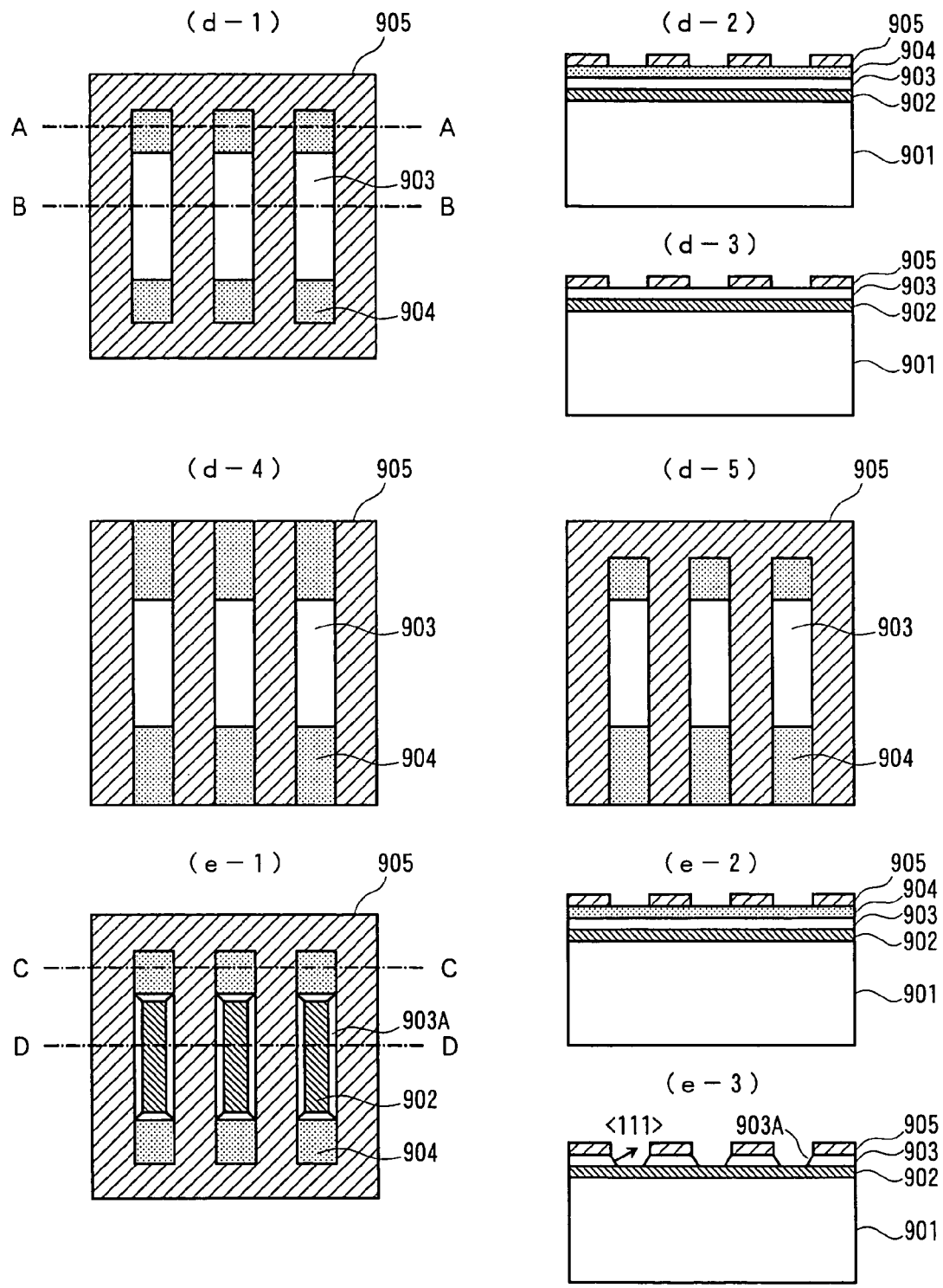
FIG. 24 shows a production process (No. 2) of the doubly-supported beams functioning as probes composed of silicon fine wires shown in FIG. 22.

(4) FIG. 24(d-1) is a plan view, FIG. 24(d-2) is a cross-sectional view taken along line A-A in FIG. 24(d-1), and FIG. 24(d-3) is a cross-sectional view taken along line B-B in FIG. 24(d-1). As shown in these figures, in Step S4, the silicon nitride ($Si_3N_4$) film 905 is patterned to form rectangular windows such that the silicon oxide ($SiO_2$) film 904 appear in both ends of each window. As shown in FIG. 24(d-4), the shape of the windows may be opened at both ends, or as shown in FIG. 24(d-5), the shape of the windows may be opened at only the bottom end.

(5) FIG. 24(e-1) is a plan view, FIG. 24(e-2) is a cross-sectional view taken along line C-C in FIG. 24(e-1), and FIG. 24(e-3) is a cross-sectional view taken along line D-D in FIG. 24(e-1). As shown in these figures, in Step S5, wet etching is performed with an alkaline solution using the silicon nitride ($Si_3N_4$) film 905 as the mask, thus forming recesses defined by <111> surfaces 903A.

Figure 25:
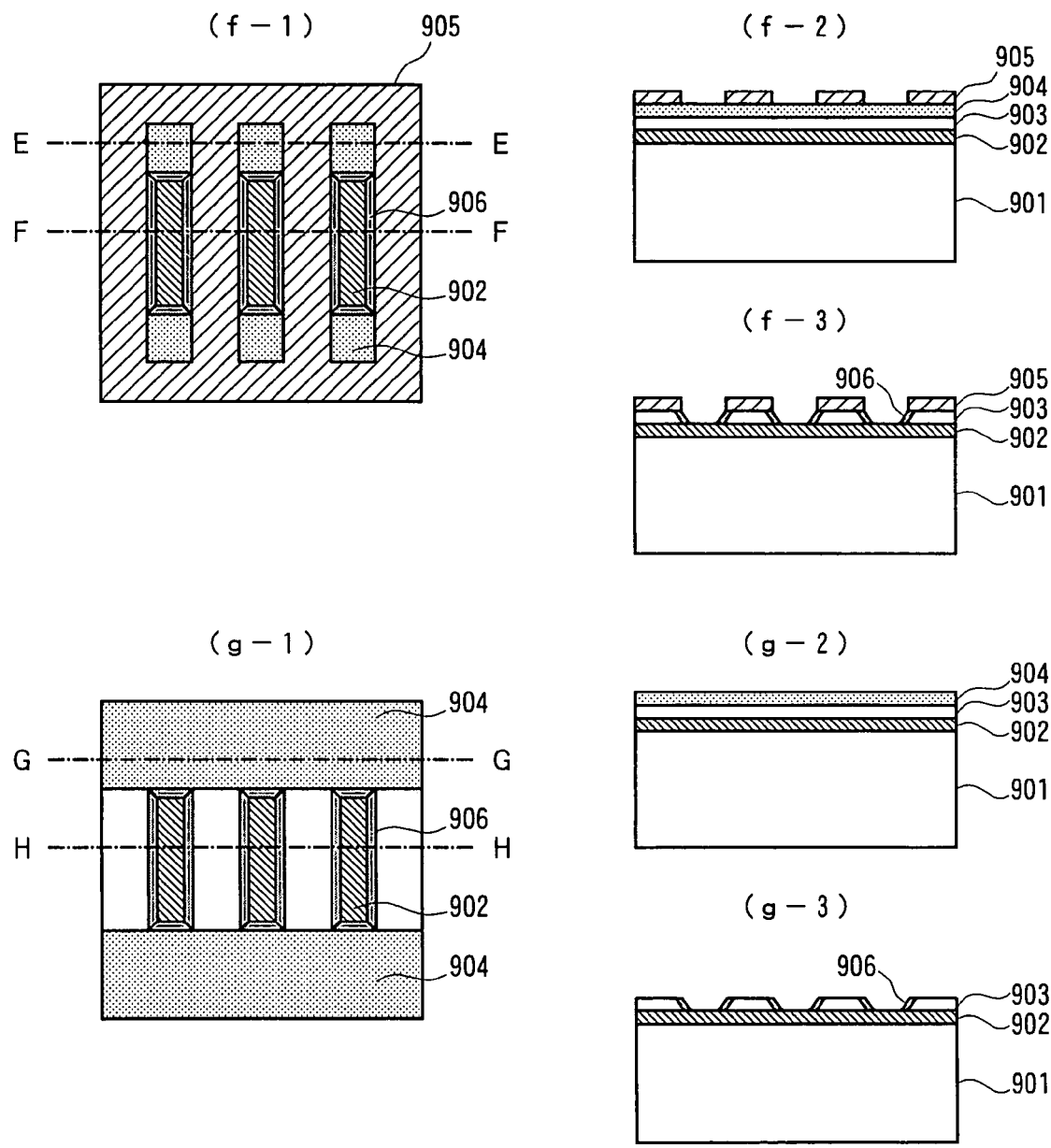
FIG. 25 shows a production process (No. 3) of the doubly-supported beams functioning as probes composed of silicon fine wires shown in FIG. 22.

(6) FIG. 25(f-1) is a plan view, FIG. 25(f-2) is a cross-sectional view taken along line E-E in FIG. 25(f-1), and FIG. 25(f-3) is a cross-sectional view taken along line F-F in FIG. 25(f-1). As shown in these figures, in Step S6, the resultant wafer is thermally oxidized using the silicon nitride ($Si_3N_4$) film 905 as the mask. As a result, the exposed <111> surfaces 903A of the silicon are protected with a thermally-oxidized film 906.

(7) FIG. 25(g-1) is a plan view, FIG. 25(g-2) is a cross-sectional view taken along line G-G in FIG. 25(g-1), and FIG. 25(g-3) is a cross-sectional view taken along line H-H in FIG. 25(g-1). As shown in these figures, in Step S7, the silicon nitride ($Si_3N_4$) film 905 is removed.

Figure 26:
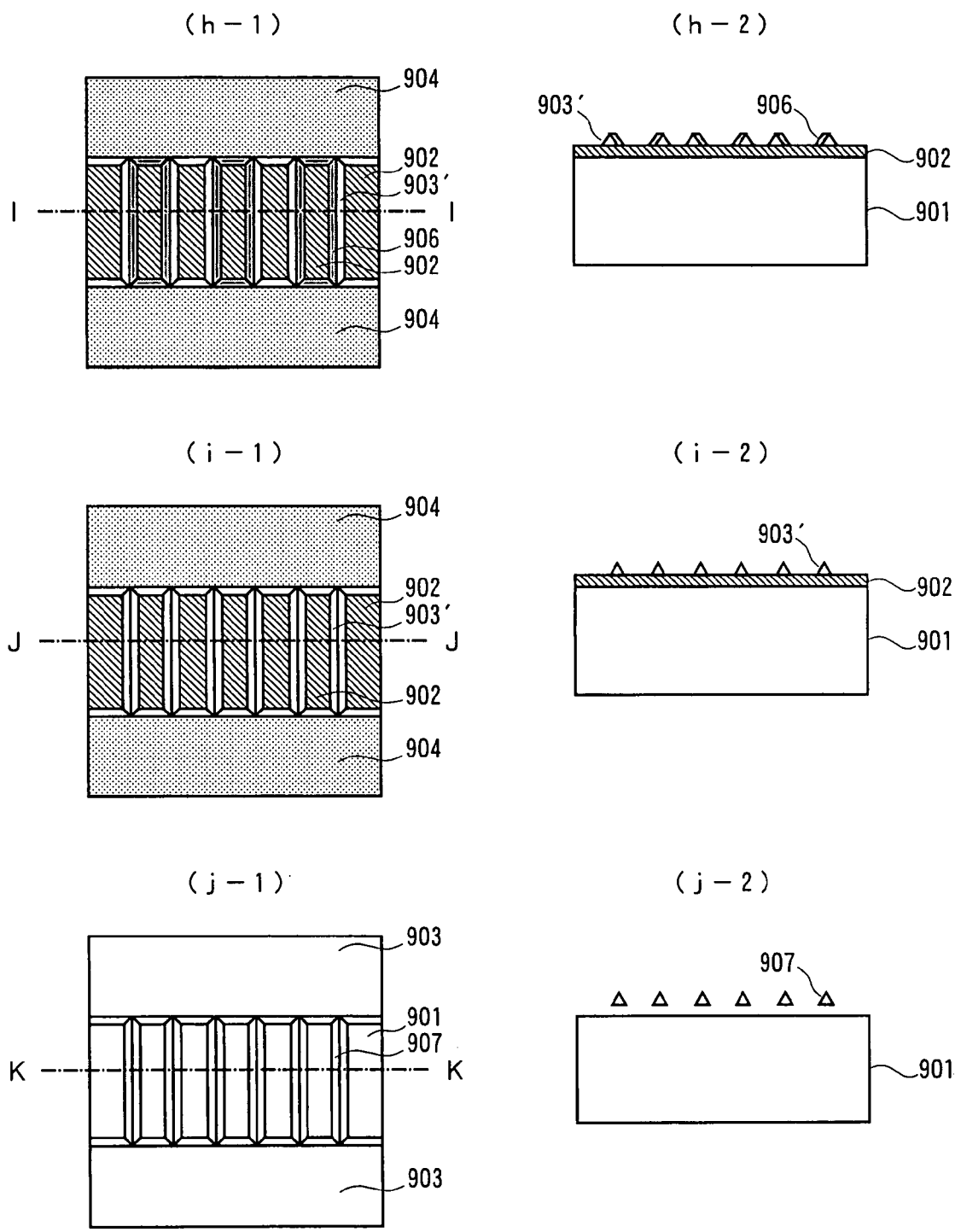
FIG. 26 shows a production process (No. 4) of the doubly-supported beams functioning as probes composed of silicon fine wires shown in FIG. 22.

(8) FIG. 26(h-1) is a plan view and FIG. 26(h-2) is a cross-sectional view taken along line I-I in FIG. 26(h-1). As shown in these figures, in Step S8, second wet etching is performed using the thermally-oxidized film 906 as the mask. Consequently, SOI layers 903' (doubly-supported beams functioning as probes) having a substantially triangular cross-section are formed on the buried oxide film 902, one surface of each SOI layer 903' being protected with the thermally-oxidized film 906.

(9) FIG. 26(i-1) is a plan view and FIG. 26(i-2) is a cross-sectional view taken along line J-J in FIG. 26(i-1). As shown in these figures, in Step S9, the thermally-oxidized film 906 formed in Step S6 is removed. As a result, the wire-shaped SOI layers 903' (doubly-supported beams functioning as probes) having a substantially triangular cross-section are formed.

(10) FIG. 26(j-1) is a plan view and FIG. 26(j-2) is a cross-sectional view taken along line K-K in FIG. 26(j-1). As shown in these figures, in Step S10, the buried oxide film 902 disposed under the wire-shaped SOI layers 903' having a substantially triangular cross-section is removed. As a result, the wire-shaped SOI layers 903' having a substantially triangular cross-section are separated from the handling wafer 901. Thus, probes 907, i.e., doubly-supported beams, composed of silicon fine wires utilizing the crystallinity of the SOI layer 903 are formed.

As described above, the method for producing a three-dimensional structure composed of silicon fine wires includes the steps of preparing an SOI substrate having a surface composed of the {100} surface of silicon single-crystals thereon; forming a silicon oxide film 904 on both ends of an SOI layer 903 of the SOI substrate; forming a silicon nitride film 905 on the silicon oxide film 904; removing a part of the silicon nitride film 905 to expose the SOI layer 903 such that elongated shapes are repeatedly arranged side-by-side so as to be parallel to the <110> direction; removing the exposed SOI layer 903 by wet etching with an alkaline solution; thermally oxidizing the {111} surfaces 903A exposed by the wet etching; removing all of the remaining silicon nitride film 905; wet etching the newly exposed SOI layer 903 with an alkaline solution; forming an array of silicon fine wires; and removing a buried oxide film 902 of the SOI substrate to form silicon fine wires 907 that can be independently oscillated.

Figure 27:
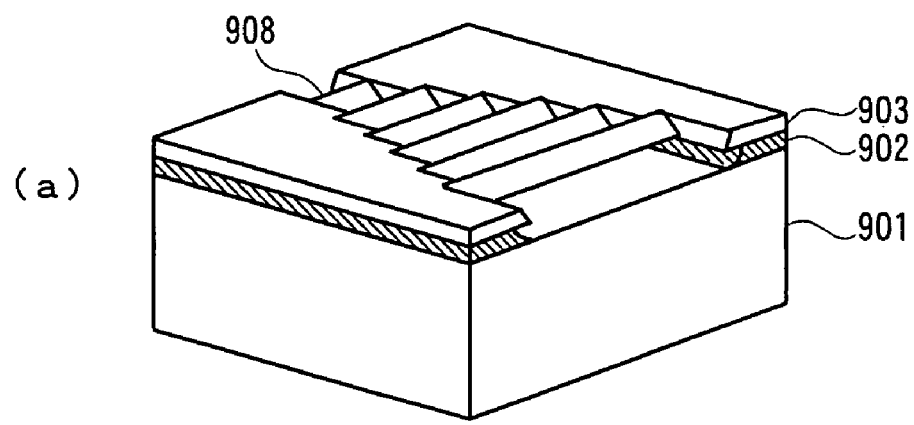
FIG. 27 shows doubly-supported beams of fine wires functioning as probes composed of silicon fine wires according to a modification of the embodiment of the present invention.
Figure 27:
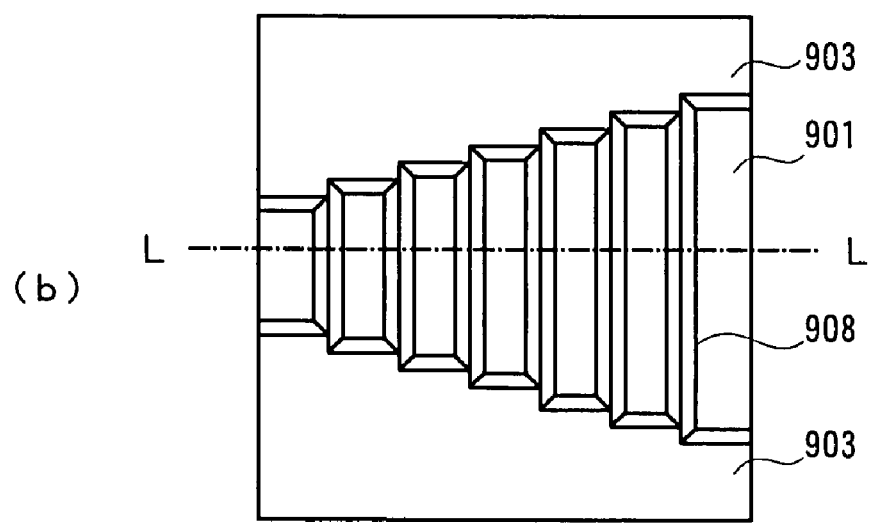
Figure 27:
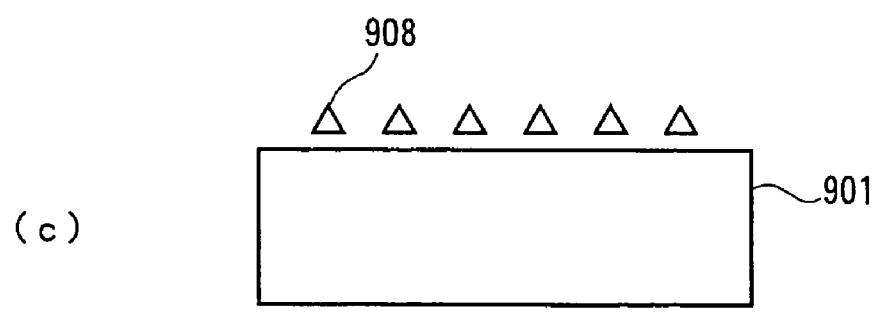

FIG. 27 shows doubly-supported beams of fine wires functioning as probes composed of silicon fine wires according to a modification of the embodiment of the present invention. FIG. 27(*a*) is a perspective view thereof, FIG. 27(*b*) is a plan view thereof, and FIG. 27(*c*) is a cross-sectional view taken along line L-L in FIG. 27(*b*).

In this embodiment, the doubly-supported beams composed of fine wires 908 are formed such that the length of each fine wire gradually changes from one to the next. Other structures are the same as those of the above silicon fine wires.

As described above, according to the present invention, doubly-supported beams composed of silicon fine wires that suffer no damage such as crystal defects can be formed by utilizing the crystallinity of silicon, in contrast to a known method in which doubly-supported beams are formed by anisotropic etching (such as RIE) regardless of the crystallinity of silicon.

Figure 28:
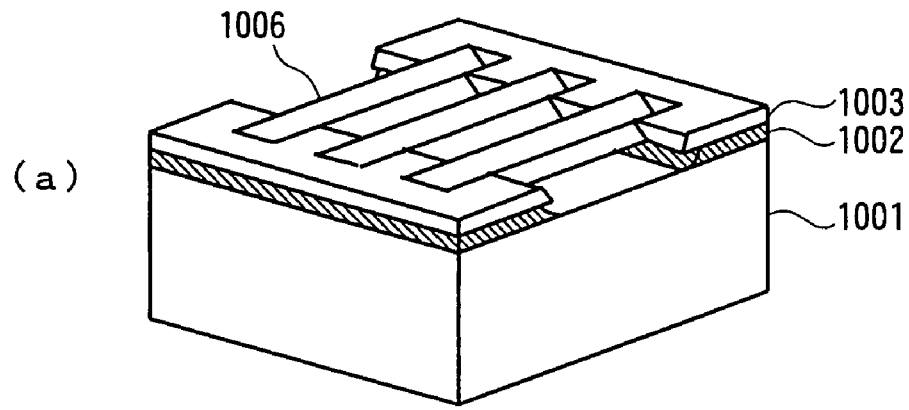
FIG. 28 shows doubly-supported beams (wherein proximal ends of the fine wires have different shapes on the two lateral sides of each fine wire) functioning as probes composed of silicon fine wires according to an embodiment of the present invention.
Figure 28:
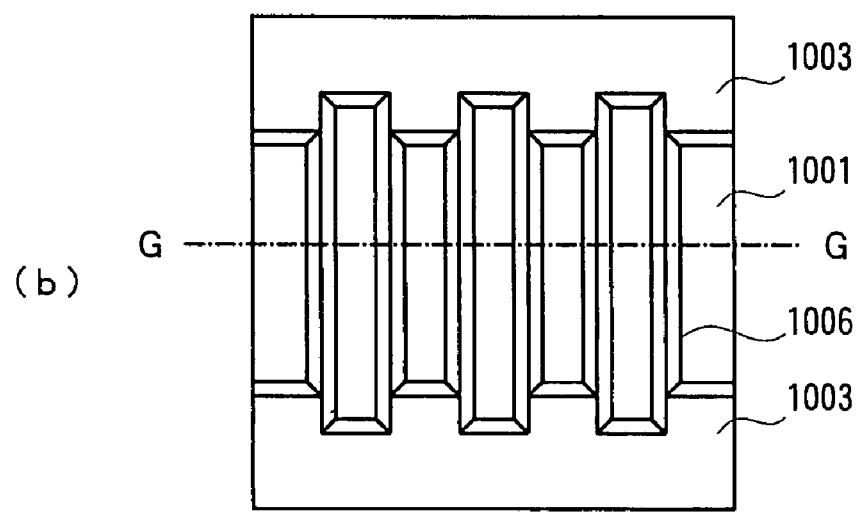
Figure 28:
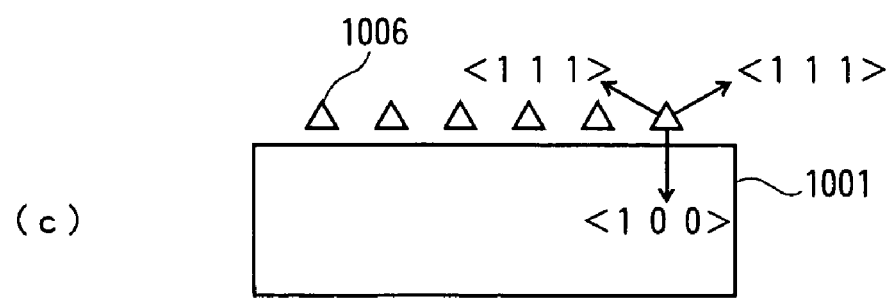

FIG. 28 shows doubly-supported beams (wherein proximal ends of the fine wires have different shapes on the two lateral sides of each fine wire) functioning as probes composed of silicon fine wires according to an embodiment of the present invention. FIG. 28(*a*) is a perspective view thereof, FIG. 28(*b*) is a plan view thereof, and FIG. 28(*c*) is a cross-sectional view taken along line G-G in FIG. 28(*b*).

In this figure, reference numeral 1001 indicates a handling wafer, reference numeral 1002 indicates a buried oxide film, reference numeral 1003 indicates an SOI layer, and reference numeral 1006 indicates silicon fine wires (doubly-supported beams) in which the proximal ends have different shapes on the two lateral sides of each fine wire, the silicon fine wires being formed by utilizing the crystallinity of the SOI layer 1003.

A method for producing the doubly-supported beams composed of fine wires will now be described with reference to FIGS. 29 to 31.

Figure 29:
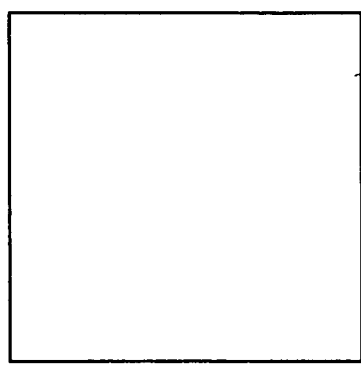
FIG. 29 shows a production process (No. 1) of the doubly-supported beams (wherein the proximal ends of the fine wires have different shapes on the two lateral sides of each fine wire) as functioning probes composed of silicon fine wires shown in FIG. 28.
Figure 29:
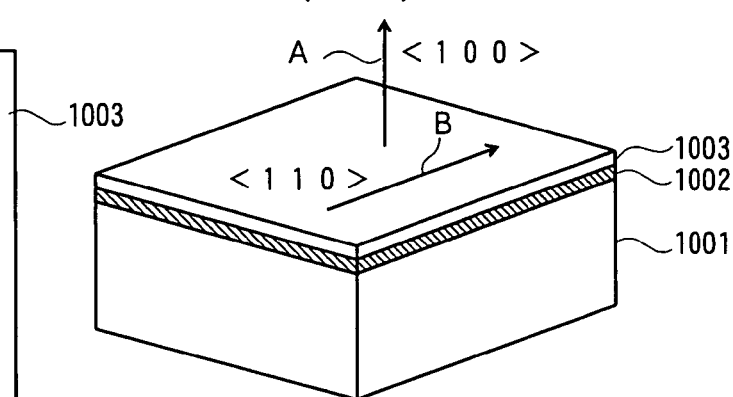
Figure 29:
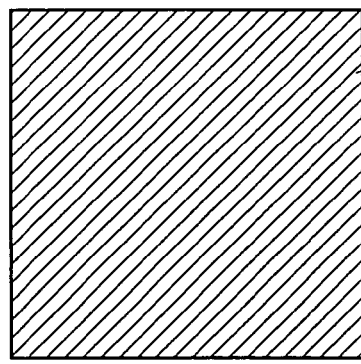
Figure 29:
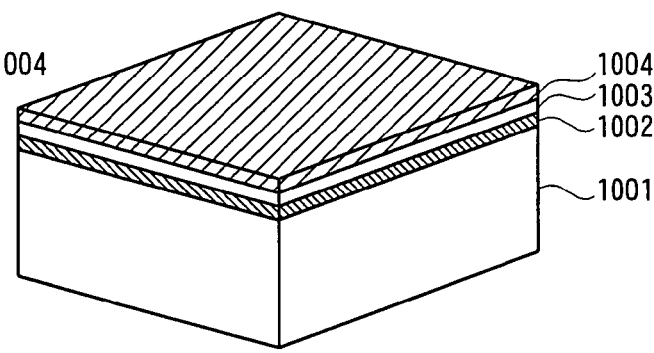
Figure 29:
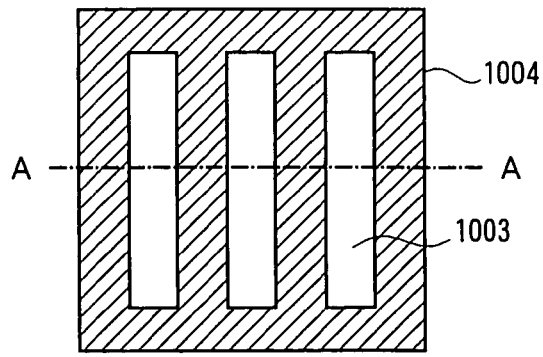
Figure 29:
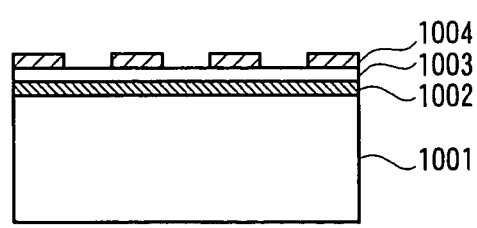

(1) FIG. 29(*a*-1) is a plan view and FIG. 29(*a*-2) is a perspective view. As shown in these figures, in Step S1, the buried oxide film 1002 is formed on the handling wafer 1001, and the SOI layer 1003 is formed on the buried oxide film 1002. Herein, arrow A indicates the <100> direction and arrow B indicates the <110> direction.

(2) FIG. 29(*b*-1) is a plan view and FIG. 29(*b*-2) is a perspective view. As shown in these figures, in Step S2, a silicon nitride ($Si_3N_4$) film 1004 is formed on the entire surface of the SOI layer 1003.

(3) FIG. 29(*c*-1) is a plan view and FIG. 29(*c*-2) is a cross-sectional view taken along line A-A in FIG. 29(*c*-1). As shown in these figures, in Step S3, the silicon nitride ($Si_3N_4$) film 1004 is patterned to form rectangular windows.

Figure 30:
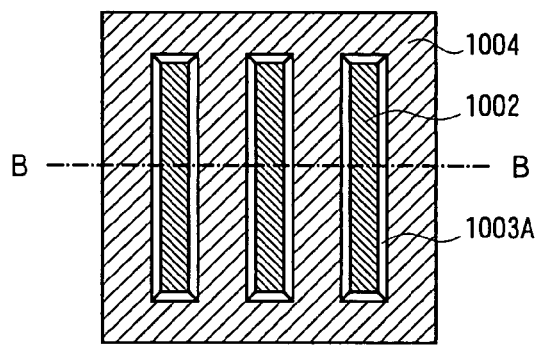
FIG. 30 shows a production process (No. 2) of the doubly-supported beams (wherein the proximal ends of the fine wires have different shapes on the two lateral sides of each fine wire) as functioning probes composed of silicon fine wires shown in FIG. 28.
Figure 30:
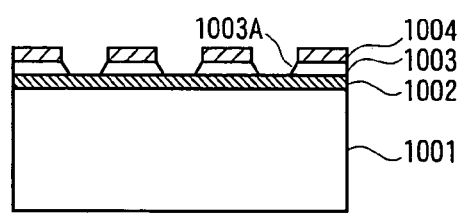
Figure 30:
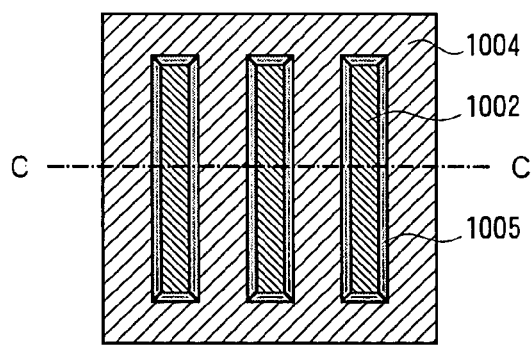
Figure 30:
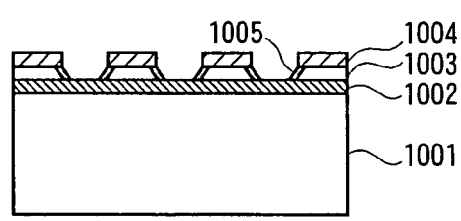
Figure 30:
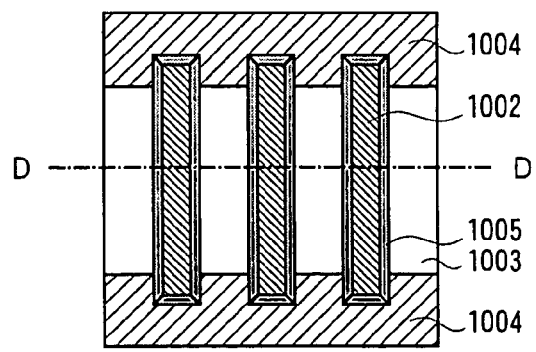
Figure 30:
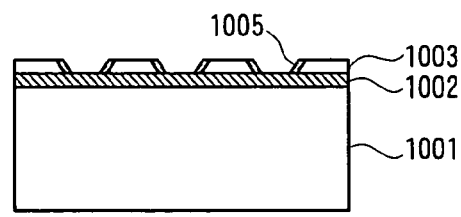

(4) FIG. 30(*d*-1) is a plan view and FIG. 30(*d*-2) is a cross-sectional view taken along line B-B in FIG. 30(*d*-1). As shown in these figures, in Step S4, wet etching is performed with an alkaline solution using the silicon nitride ($Si_3N_4$) film 1004 as the mask, thus forming recesses defined by <111> surfaces 1003A.

(5) FIG. 30(*e*-1) is a plan view and FIG. 30(*e*-2) is a cross-sectional view taken along line C-C in FIG. 30(*e*-1). As shown in these figures, in Step S5, the resultant wafer is thermally oxidized using the silicon nitride ($Si_3N_4$) film 1004 as the mask. As a result, the exposed <111> surfaces 1003A of the silicon are protected with a thermally-oxidized film 1005.

(6) FIG. 30(*f*-1) is a plan view and FIG. 30(*f*-2) is a cross-sectional view taken along line D-D in FIG. 30(*f*-1). As shown in these figures, in Step S6, the silicon nitride ($Si_3N_4$) film 1004 is partly removed such that the length of the removed portion is shorter than the length of the rectangular windows.

Figure 31:
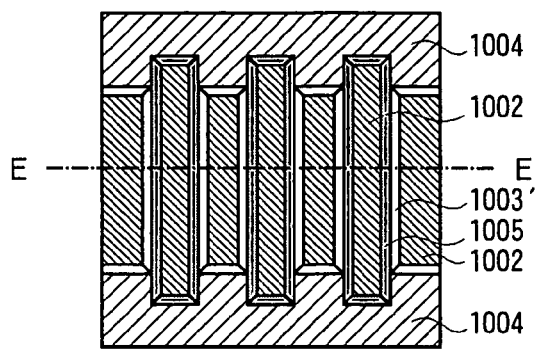
FIG. 31 shows a production process (No. 3) of the doubly-supported beams (wherein the proximal ends of the fine wires have different shapes on the two lateral sides of each fine wire) as functioning probes composed of silicon fine wires shown in FIG. 28.
Figure 31:
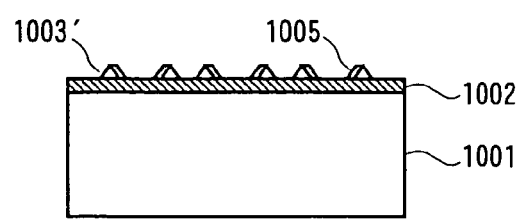
Figure 31:
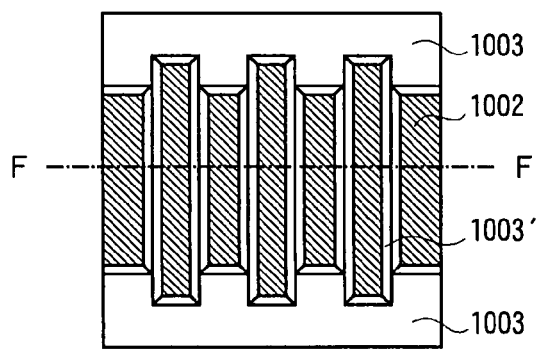
Figure 31:
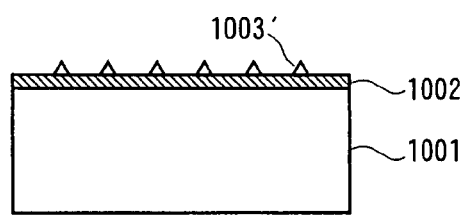
Figure 31:
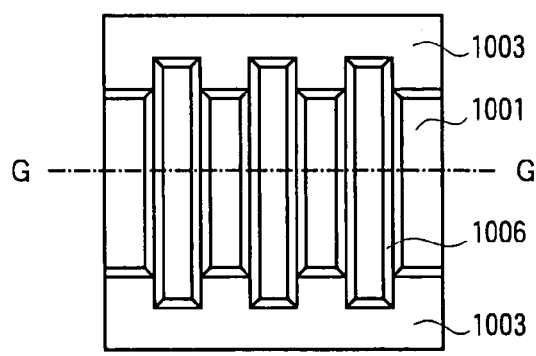
Figure 31:
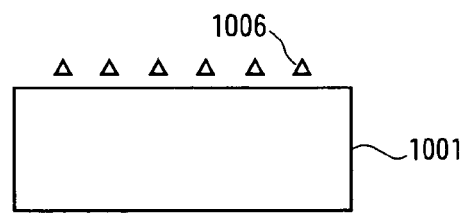

(7) FIG. 31(*g*-1) is a plan view and FIG. 31(*g*-2) is a cross-sectional view taken along line E-E in FIG. 31(*g*-1). As shown in these figures, in Step S7, second wet etching is performed using the thermally-oxidized film 1004 as the mask. Consequently, SOI layers 1003' (doubly-supported beams functioning as probes) having a substantially triangular cross-section are formed on the buried oxide film 1002, one surface of each SOI layer 1003' being protected with the thermally-oxidized film 1005.

(8) FIG. 31(*h*-1) is a plan view and FIG. 31(*h*-2) is a cross-sectional view taken along line F-F in FIG. 31(*h*-1). As shown in these figures, in Step S8, the thermally-oxidized film 1005 formed in Step S5 and the silicon nitride ($Si_3N_4$) film 1004 are removed. As a result, the wire-shaped SOI layers 1003' (doubly-supported beams) having a substantially triangular cross-section are formed.

(9) FIG. 31(*i*-1) is a plan view and FIG. 31(*i*-2) is a cross-sectional view taken along line G-G in FIG. 31(*i*-1). As shown in these figures, in Step S9, the buried oxide film 1002 disposed under the wire-shaped SOI layers 1003' having a substantially triangular cross-section is removed. As a result, silicon fine wires (doubly-supported beams) 1006 having different shapes on the two lateral sides of each fine wire are formed by utilizing the crystallinity of the SOI layer 1003.

As described above, the silicon fine wires (doubly-supported beams) 1006 having different shapes on the two lateral sides of each fine wire can be produced inexpensively by a simple process that omits a step of forming a silicon oxide film. These doubly-supported beams have a durable structure because the proximal ends of each doubly-supported beam have an asymmetrical shape. Accordingly, doubly-supported beams having durability against aging, not being easily broken, and utilizing the crystallinity of silicon can be formed.

The present invention is not limited to the above embodiments. Various modifications can be made based on the purpose of the present invention, and those modifications are not excluded from the scope of the present invention.

As described above in detail, the present invention provides the following advantages.

(A) An oscillator composed of fine wires can be achieved. As a result, the oscillation direction can be limited depending on the combination of the fine wires. In addition, since the fine wires have a smooth crystal face, the oscillation loss due to the surface can be reduced. As a result, an oscillator having a high Q factor can be achieved.

(B) An oscillator composed of fine wires can be achieved. As a result, an oscillator wherein the decrease in characteristic frequency and the decrease in the Q factor are low even in a liquid can be achieved. Accordingly, an oscillator suitable for higher sensitivity and high-speed detection can be achieved.

(C) An oscillator composed of fine wires can be achieved. The oscillator can be used as a coil that can generate a magnetic field or detect a magnetic field as Lorentz force in response to a current flow.

(D) A coil composed of fine fires can be achieved. As a result, the coil can detect the temperature-dependent resistance variation in the area where the coil is in contact with a sample. Thus, the temperature in a minute area of the sample can be measured. As a result, mapping of the temperature distribution of electronic devices and mapping of the distribution of the temperature and metabolism of biological materials can be achieved. Furthermore, since a large number of fine coils can be produced with high uniformity, confirmation tests and multipoint measurements can be performed.

(E) A network structure can be formed using a plurality of fine wires, thereby trapping samples having a specific particle size.

(F) A network structure can be formed using a plurality of fine wires. As a result, the network structure can achieve a filter to adsorb a specific substance by modifying the surface thereof. This filter has chemical and physical selectivity.

(G) A network structure can be formed using a plurality of fine wires to function as an elastic body as a whole.

(H) A network structure can be formed using a plurality of fine wires, thereby achieving a three-dimensional optical filter, a grating, and a shielding window. A three-dimensional structure having a regular shape can be achieved, and therefore, selectivity depending on the direction and the wavelength can be obtained. An optical modulation element can be achieved by vibrating the structure.

(I) A network structure can be formed using a plurality of fine wires. This network structure forms a resistor having a grid shape to achieve an electrical circuit network. The electrical circuit network having the network structure can be achieved, thereby realizing a fine three-dimensional body that can perform three-dimensional sensing.

(J) A structure of up to three-dimensions can be formed using a plurality of fine wires. A tip or a block can be formed at an intersection of the fine wires by wet etching. The tip or the block can be used as a probe or a mass, thereby providing a structure having predetermined vibration characteristics. As a result, this structure can control the vibration characteristics, which can normally be controlled only with a macroscopic structure or a handmade three-dimensional structure. Furthermore, this structure provides a high Q factor and high design flexibility.

(K) A cantilever composed of fine wires and a tip used in a scanning probe microscope can be formed. In optical microscopy or scanning electron microscopy performed perpendicularly with respect to a sample, even the close vicinity of the tip can be directly observed using this cantilever. As a result, the relationship between the relative positions of microscope images can be obtained and each microscopy can be performed more readily.

In other words, the following can be achieved: (1) the generation of a magnetic field and the detection of a magnetic field by realizing a fine coil, and the improvement in detection sensitivity by modulating the current flowing in the coil; (2) temperature measurement and mapping by realizing a fine resistor; (3) the detection of mass and force on the atomic level by the achievement of a fine oscillator; (4) the achievement of an oscillator having a low oscillation loss and a low decease in frequency in liquid by realizing a fine oscillator, and the improvement of the sensitivity and increase in the frequency thereby; (5) physical and chemical filtering functions by a fine three-dimensional structure; (6) the achievement of an optical element composed of a fine three-dimensional structure; (7) a scanning probe microscope within an optical microscope or a scanning electron microscope wherein the field of view is not easily blocked; and (8) the improvement of confirmation test reliability and the achievement of multipoint measurements as a result of the production, with high uniformity, of a large number of the various structures or sensing elements mentioned above.

(L) In the present invention, singly-supported beams composed of silicon fine wires that suffer no damage such as crystal defects can be formed by utilizing the crystallinity of silicon, in contrast to a known method in which singly-supported beams are formed by anisotropic etching (such as RIE) regardless of the crystallinity of silicon.

(M) Singly-supported beams in which proximal ends of the fine wires functioning as probes have different shapes on the two lateral sides of each fine wire are provided. Such singly-supported beams can be produced inexpensively by a simple process that omits a step of forming a silicon oxide film. These singly-supported beams have a durable structure because the proximal ends of the singly-supported beams have an asymmetrical shape. Accordingly, singly-supported beams having durability against aging, not being easily broken, and utilizing the crystallinity of silicon can be formed.

(N) Singly-supported beams having excellent probe characteristics and the same length can be readily formed.

(O) Singly-supported beams having excellent probe characteristics and different length can be readily formed.

(P) Doubly-supported beams composed of silicon fine wires that suffer no damage such as crystal defects can be formed by utilizing the crystallinity of silicon, in contrast to a known method in which doubly-supported beams are formed by anisotropic etching (such as RIE) regardless of the crystallinity of silicon.

(Q) Doubly-supported beams in which the proximal ends of the fine wires functioning as probes have different shapes on the two lateral sides of each fine wire are provided. These doubly-supported beams have a durable structure because the proximal ends of each doubly-supported beam have an asymmetrical shape. Accordingly, doubly-supported beams having durability against aging, not being easily broken, and utilizing the crystallinity of silicon can be formed.

(R) Doubly-supported beams having excellent probe characteristics and the same length can be readily formed.

(S) Doubly-supported beams having excellent probe characteristics and different length can be readily formed.

(T) A three-dimensional structure including singly-supported beams or doubly-supported beams composed of silicon fine wires, and having excellent probe characteristics can be produced.

INDUSTRIAL APPLICABILITY

The present invention is suitable for reading out very high-density information, measuring mechanical or physical properties of minute samples, and measuring magnetism or atomic force with high resolution. The present invention is particularly useful as a measurement technology on the order of nanometers.

The invention claimed is:

1. A method for producing a three-dimensional structure composing silicon fine wires, the method comprising the steps of:
   preparing a silicon-on-insulator (SOI) substrate having a surface composed of the {100} surface of silicon single-crystals thereon;
   forming a silicon oxide film on a part of an SOI layer of the SOI substrate;
   forming a silicon nitride film on the silicon oxide film and the part of the SOI layer;
   removing a part of the silicon nitride film to expose the SOI layer such that elongated shapes are repeatedly arranged so as to be parallel to the <110> direction;
   removing the exposed SOI layer portions by wet etching;
   thermally oxidizing the {111} surface exposed by the wet etching to form a thermally-oxidized film;
   removing a part of the remaining silicon nitride film and wet etching the newly exposed SOI layer to form an array of silicon fine wires; and
   removing a buried oxide film of the SOI substrate to form silicon fine wires that can be independently oscillated,
   wherein the silicon fine wires are processed such that each fine wire has a different length.

2. A method for producing a three-dimensional structure composing silicon fine wires, the method comprising the steps of:
   preparing an SOI substrate having a surface composed of the {100} surface of silicon single-crystals thereon;
   forming a silicon nitride film on an SOI layer of the SOI substrate;
   removing a part of the silicon nitride film to expose the SOI layer such that elongated shapes are repeatedly arranged so as to be parallel to the <110> direction;
   removing the exposed SOI layer portions by wet etching;
   thermally oxidizing the {111} surface exposed by the wet etching to form a thermally-oxidized film;
   removing a part of the remaining silicon nitride film and wet etching the newly exposed SOI layer to form an array of silicon fine wires; and
   removing a buried oxide film of the SOI substrate to form silicon fine wires that can be independently oscillated,
   wherein the silicon fine wires are processed such that each fine wire has a different length.

3. The method for producing a three-dimensional structure composing silicon fine wires according to claim 1, wherein the three-dimensional structure comprises probes.

4. The method for producing a three-dimensional structure composing silicon fine wires according to claim 3, wherein the probes are singly-supported beams.

5. The method for producing a three-dimensional structure composing silicon fine wires according to claim 4, wherein the singly-supported beams are cantilevers for an atomic force microscope.

6. The method for producing a three-dimensional structure composing silicon fine wires according to claim 3, wherein the probes are doubly-supported beams.

7. The method for producing a three-dimensional structure composing silicon fine wires according to claim 2, wherein the three-dimensional structure comprises probes.

8. The method for producing a three-dimensional structure composing silicon fine wires according to claim 7, wherein the probes are singly-supported beams.

9. The method for producing a three-dimensional structure composing silicon fine wires according to claim 8, wherein the singly-supported beams are cantilevers for an atomic force microscope.

10. The method for producing a three-dimensional structure composing silicon fine wires according to claim 7, wherein the probes are doubly-supported beams.

11. A three-dimensional structure comprising silicon fine wires produced by the method for producing a three-dimensional structure composing silicon fine wires according to claim 1.

12. A three-dimensional structure comprising silicon fine wires produced by the method for producing a three-dimensional structure composing silicon fine wires according to claim 2.

* * * * *